(12) United States Patent
Frost

(10) Patent No.: US 10,889,229 B2
(45) Date of Patent: Jan. 12, 2021

(54) VEHICLE RACK

(71) Applicant: Frost Contracting, Inc., Millarville (CA)

(72) Inventor: Richard J. Frost, Calgary (CA)

(73) Assignee: FROST CONTRACTING, INC., Millarville (CA)

( * ) Notice: Subject to any disclaimer, the term of this patent is extended or adjusted under 35 U.S.C. 154(b) by 120 days.

(21) Appl. No.: 16/378,092

(22) Filed: Apr. 8, 2019

(65) Prior Publication Data

US 2019/0232854 A1    Aug. 1, 2019

Related U.S. Application Data

(63) Continuation-in-part of application No. 16/229,636, filed on Dec. 21, 2018, now abandoned, which is a continuation of application No. 15/454,943, filed on Mar. 9, 2017, now Pat. No. 10,160,371, which is a continuation-in-part of application No. 14/282,748, filed on May 20, 2014, now abandoned.

(51) Int. Cl.
| | |
|---|---|
| *B60P 3/06* | (2006.01) |
| *B60R 9/08* | (2006.01) |
| *B60R 9/042* | (2006.01) |
| *B60P 3/10* | (2006.01) |
| *B60P 1/43* | (2006.01) |
| *B60P 3/07* | (2006.01) |

(52) U.S. Cl.
CPC ............... *B60P 3/06* (2013.01); *B60P 1/435* (2013.01); *B60P 3/07* (2013.01); *B60P 3/1025* (2013.01); *B60R 9/042* (2013.01); *B60R 9/08* (2013.01); *B60P 3/064* (2013.01); *B60P 3/1091* (2013.01)

(58) Field of Classification Search
CPC ........... B60P 3/06; B60P 1/435; B60P 3/1025; B60P 3/07; B60P 3/1091; B60P 3/064; B60R 9/08; B60R 9/042
See application file for complete search history.

(56) References Cited

U.S. PATENT DOCUMENTS

| | | |
|---|---|---|
| 2,765,940 A | 10/1956 | Nelson |
| 3,001,679 A | 9/1961 | Canning |
| 3,038,617 A | 6/1962 | Seegrist |
| 3,048,291 A | 8/1962 | Mabry |
| 3,077,998 A | 2/1963 | Balko |
| 3,091,208 A | 5/1963 | Copeland |
| 3,160,297 A | 12/1964 | Auton |
| 3,170,583 A | 2/1965 | Meyer |
| 3,343,696 A | 9/1967 | Morrison |

(Continued)

FOREIGN PATENT DOCUMENTS

| | | |
|---|---|---|
| CA | 2076255 A1 | 2/1994 |
| CA | 2079170 A1 | 3/1994 |

(Continued)

OTHER PUBLICATIONS

Truckboss home page; http://truckbossdecks.com/; last accessed Feb. 18, 2020.

*Primary Examiner* — D Glenn Dayoan
*Assistant Examiner* — Melissa Ann Bonifazi
(74) *Attorney, Agent, or Firm* — Benesch, Friedlander, Coplan & Aronoff LLP

(57) ABSTRACT

A vehicle rack for hauling one or more personal recreational vehicles is provided. A vehicle rack may be adjustable to allow one or more personal recreation vehicles to be stored above a vehicle's cargo area allowing the vehicle to also tow a trailer.

23 Claims, 24 Drawing Sheets

(56) References Cited

U.S. PATENT DOCUMENTS

| | | |
|---|---|---|
| 3,382,993 A | 5/1968 | Bahrs |
| 3,411,644 A | 11/1968 | Cook |
| 3,613,920 A | 10/1971 | Flamm |
| 3,648,866 A | 3/1972 | Slown |
| 3,708,081 A | 1/1973 | Schladenhauffen |
| 3,734,321 A | 5/1973 | Long |
| 3,877,594 A | 4/1975 | Coakley |
| 3,927,779 A | 12/1975 | Johnson |
| 3,972,433 A | 8/1976 | Reed |
| 3,976,213 A | 8/1976 | Ball |
| 4,212,580 A | 6/1980 | Fluck |
| 4,274,788 A | 6/1981 | Sutton |
| 4,531,879 A | 7/1985 | Horowitz |
| 4,960,356 A | 10/1990 | Wrenn |
| 5,005,846 A | 4/1991 | Taylor |
| 5,069,595 A | 12/1991 | Smith |
| 5,071,308 A | 12/1991 | Tibbet |
| 5,108,248 A | 4/1992 | Murrill |
| 5,184,914 A | 2/1993 | Basta |
| 5,249,545 A | 10/1993 | Gettman |
| 5,249,910 A | 10/1993 | Ball |
| 5,257,728 A | 11/1993 | Gibson |
| 5,431,525 A | 7/1995 | Scott |
| 5,511,928 A | 4/1996 | Ellis |
| 5,542,810 A | 8/1996 | Florus |
| 5,553,762 A | 9/1996 | Brown |
| 5,603,600 A | 2/1997 | Egan |
| 5,609,462 A | 3/1997 | Reimer |
| 5,620,296 A | 4/1997 | McMahon et al. |
| 5,810,546 A | 9/1998 | Schmoling |
| 5,882,170 A | 3/1999 | Walton |
| 5,897,284 A | 4/1999 | Ardohain |
| 5,934,863 A | 8/1999 | Beck |
| 5,961,139 A | 10/1999 | Nichols |
| 6,152,674 A | 11/2000 | Ogrodnick |
| 6,210,096 B1 | 4/2001 | Fielder |
| 6,357,991 B1 | 3/2002 | Hamlett |
| 7,302,725 B2 | 12/2007 | Thygesen |
| 8,133,000 B2 | 3/2012 | Olson |
| 8,371,427 B1 | 2/2013 | Miklos |
| 8,496,281 B2 | 7/2013 | Thygesen |
| 8,864,001 B2 | 10/2014 | Langseder |
| 9,017,004 B1 | 4/2015 | Brown |
| 2005/0111945 A1 | 5/2005 | Miller |
| 2006/0182573 A1 | 8/2006 | Taylor |
| 2007/0177964 A1 | 8/2007 | Bosela |
| 2008/0008528 A1 | 1/2008 | Hey |
| 2008/0019812 A1 | 1/2008 | Moryski |
| 2008/0100075 A1 | 5/2008 | Derecktor |
| 2008/0267729 A1 | 10/2008 | Barker |
| 2009/0026784 A1 | 1/2009 | Green |
| 2010/0040413 A1 | 2/2010 | Whaley |
| 2010/0316474 A1 | 12/2010 | Stiles |
| 2011/0250042 A1 | 10/2011 | Juarez-Ortega |
| 2017/0120833 A1 | 5/2017 | Rudnicki |

FOREIGN PATENT DOCUMENTS

| | | |
|---|---|---|
| CA | 2299799 A1 | 8/2001 |
| CA | 2328086 A1 | 9/2001 |
| CA | 2464210 A1 | 5/2003 |
| CA | 2517628 A1 | 3/2006 |
| CA | 2510936 A1 | 12/2006 |
| CA | 2646889 A1 | 9/2007 |
| DE | 2846791 A1 | 5/1980 |
| FR | 1384723 A | 1/1965 |
| FR | 2862922 A1 | 6/2005 |
| FR | 2877891 B1 | 8/2008 |
| WO | 2007109808 A2 | 9/2007 |

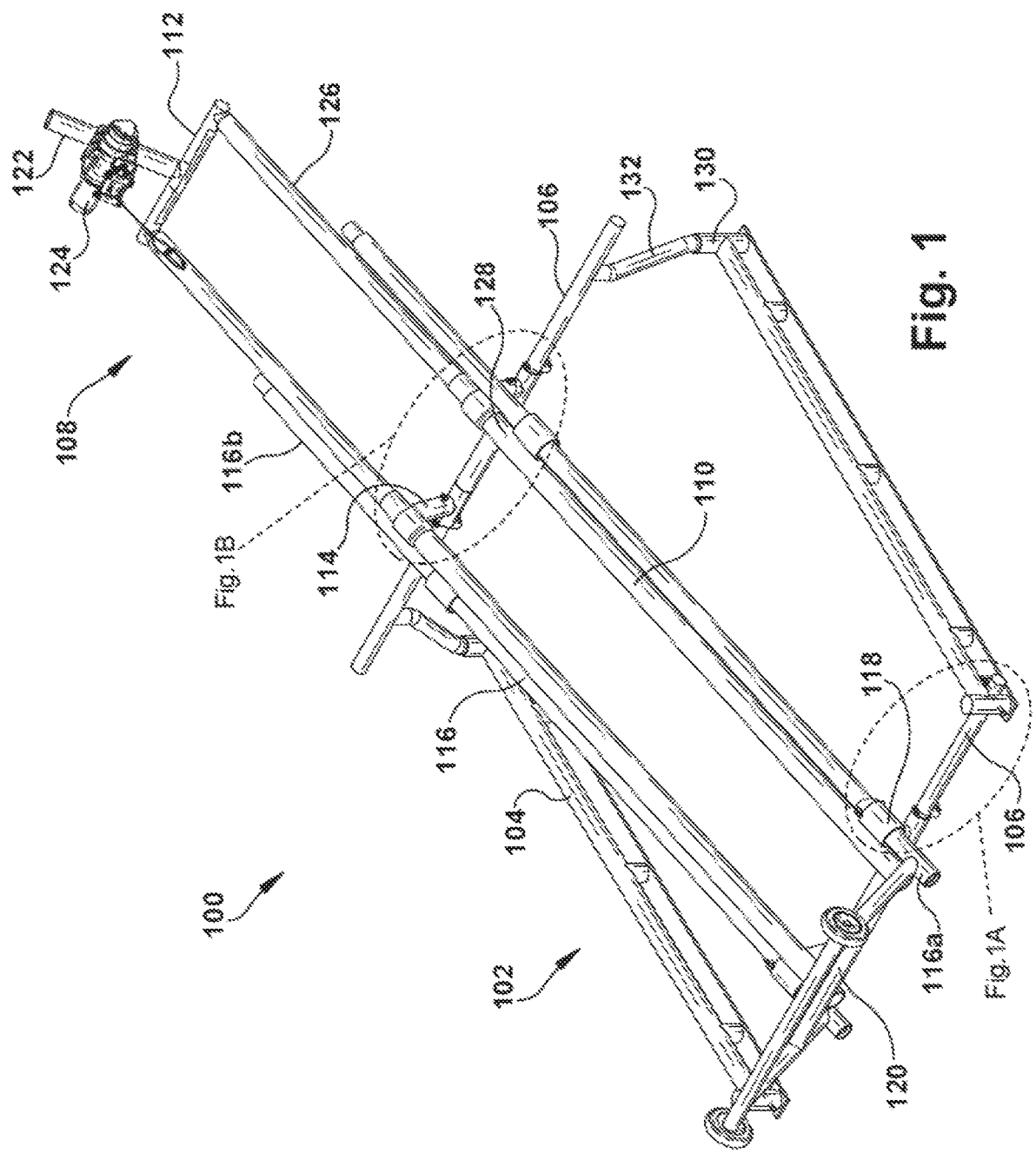

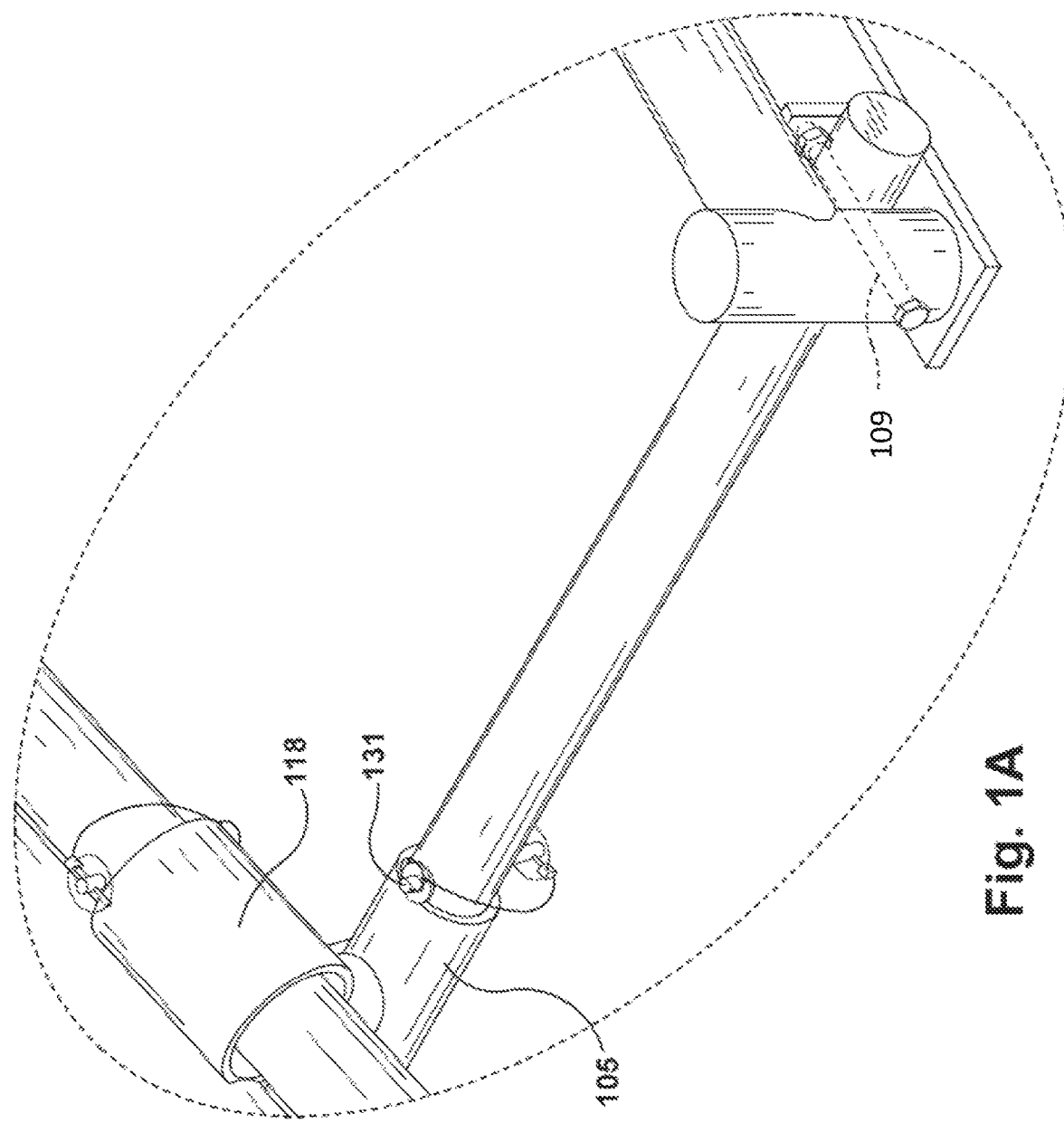

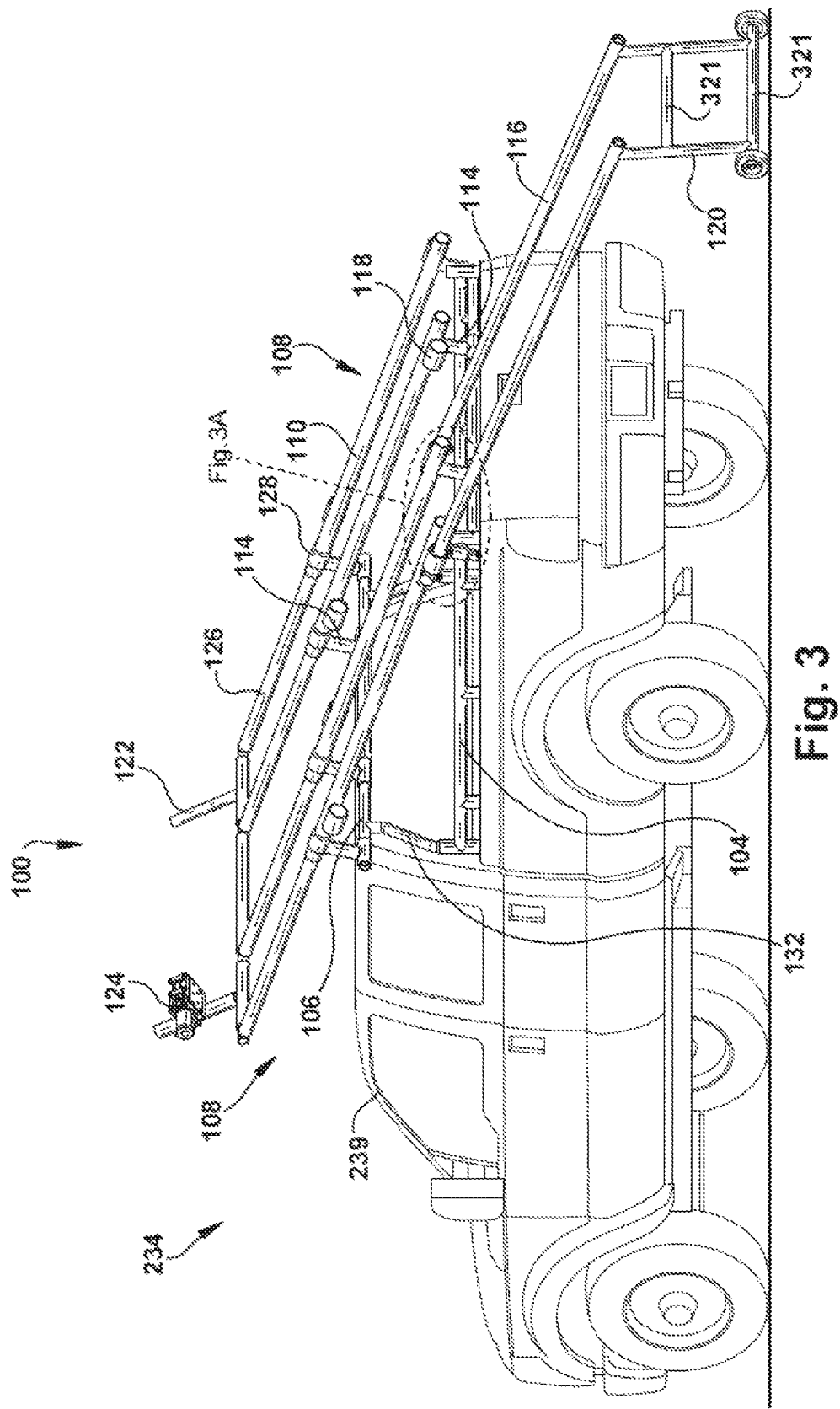

VEHICLE RACK

RELATED APPLICATIONS

The present application claims priority to and is a continuation-in-part of U.S. patent application Ser. No. 16/229,636, filed Dec. 21, 2018, which is a continuation of U.S. patent application Ser. No. 15/454,943, filed Mar. 9, 2017, now U.S. Pat. No. 10,160,371, issued Dec. 25, 2018, which is a continuation-in-part of U.S. patent application Ser. No. 14/282,748, filed May 20, 2014. The entire contents of the above-mentioned applications are incorporated herein by reference.

BACKGROUND

Personal recreational vehicles such as jet skis, snowmobiles, all-terrain vehicles ATVs, and the like, are enjoyed by many outdoor enthusiasts. Personal recreational vehicles may be transported from a storage location to a point of use. For example, personal watercraft (PWC) may be transported to a body of water prior to use. Traditional methods of hauling personal recreational vehicles include the use of trailers and vehicles with cargo areas such as truck beds. Hauling personal recreational vehicles may limit outdoor enthusiasts to using a vehicle to pull a trailer holding these items. Based on the remoteness of some recreational vehicle activities, many outdoor enthusiasts often enjoy camping in addition to using personal recreational vehicles. Transporting a recreational vehicle on either a trailer or in a truck cargo area may prevent outdoor enthusiasts from also towing a travel trailer or camper.

The present application appreciates that convenient transportation of personal recreational vehicles may be a challenging endeavor.

SUMMARY

In one embodiment, a rack and davit system may include a vehicle rack for conveying a personal vehicle. The vehicle rack may include an outer frame that may be operable to mount to a bed side rail of a vehicle, and the outer frame may include two longitudinal outer frame parallel members that may be joined by at least one outer frame cross member. The vehicle rack may include at least one inner frame that may be operatively connected to the at least one outer frame cross member, and the at least one inner frame may include two longitudinal inner frame parallel members that may be joined by at least one inner frame cross member. The vehicle rack may include two telescoping members, and each telescoping member may be operatively connected to a longitudinal inner frame parallel member. The two telescoping members may be operable to extend from and retract to the two longitudinal inner frame parallel members, such that when extended, the two telescoping members form a substantially parallel rail operable to convey an item for storage on the inner frame. The vehicle rack may include at least two telescoping member guides that may be each operatively connected to each of the two longitudinal inner frame parallel members, and the at least two telescoping member guides may be operable to guide and retain each of the two telescoping members. The at least two telescoping member guides may be further operable to adjust an angle of each of the two telescoping members. The vehicle rack may be mountable to the bed side rail of the vehicle such that the vehicle rack is clear of a tailgate and a bed of the vehicle effective to permit one or more of: use of the tailgate and the bed of the vehicle while the vehicle rack is mounted; and use of a trailer attached to the vehicle without interference from the personal recreational vehicle loaded on the vehicle rack. Each of the two telescoping members may be selectively removable from the at least one inner frame, and each of the two telescoping members may further include a distal end portion and a proximal end portion, the distal end portion operable to telescope away from the at least one inner frame and the proximal end portion operable to remain operatively connected to the at least one inner frame. The distal end portion may be connected to a dolly via a hinge or a selective mount, the dolly comprises a support comprising one or more wheels, one or more legs, or both, wherein the hinge or the selective mount may be configured to adjust the dolly between a support-up orientation and a support-down orientation. The rack and davit system may include a davit removably coupled to the vehicle rack. The davit may include a first arm removably coupled to the outer frame of the vehicle rack and a second arm pivotally coupled to the first arm via a pivot assembly. The davit may include a first pulley coupled to the pivot assembly and a second pulley coupled to a distal end of the second arm away from the pivot assembly. The davit may also include a winch having a winch line extending from the winch to the first pulley to the second pulley.

In another embodiment, a vehicle rack and davit system may include a vehicle rack. The vehicle rack may include an outer frame operable to mount to a bed side rail of a vehicle, and the outer frame may include two longitudinal outer frame parallel members that may be joined by at least one outer frame cross member. The vehicle rack may include at least one inner frame that may be operatively connected to the at least one outer frame cross member by at least one adjustable inner frame standoff, and the at least one inner frame may include two longitudinal inner frame parallel members that may be joined by at least one inner frame cross member. The vehicle rack may include two telescoping members, and each telescoping member may be operatively connected to a longitudinal inner frame parallel member. The two telescoping members may be operable to extend from and retract to the two longitudinal inner frame parallel members, such that when extended, the two telescoping members form a substantially parallel rail operable to convey an item for storage on the inner frame. Each of the two telescoping members may further include a distal end portion and a proximal end portion, the distal end portions may be operable to telescope away from the at least one of the two longitudinal inner frame parallel members and the proximal end portion may be operable to remain operatively connected to the at least one of the two longitudinal inner frame parallel members. The distal end portion may be connected to a dolly via a hinge or a selective mount, and the dolly may include a support comprising one or more wheels, one or more legs, or both. The hinge or the selective mount may be configured to adjust the dolly between a support-up orientation and a support-down orientation. The vehicle rack may include at least two telescoping member guides that may be each operatively connected to each of the two longitudinal inner frame parallel members. The at least two telescoping member guides may be operable to guide and retain each of the two telescoping members, and the at least two telescoping member guides may be further operable to adjust an angle of each of the two telescoping members. The vehicle rack may be mountable to the bed side rail of the vehicle such that the vehicle rack is clear of a tailgate and a bed of the vehicle effective to permit one or more of: use of the tailgate and the bed of the vehicle while the vehicle rack is mounted; and use of a trailer attached to the vehicle without interference from a personal recreational vehicle loaded on the vehicle rack. A portion of the vehicle rack other than the two longitudinal outer frame parallel members may be selectively removable from the two longitudinal outer frame parallel members according to disconnection of one or more of: at least one removable vertical member coupled to one or more sockets that together operatively couple the at least one outer frame cross member to the two longitudinal outer frame parallel members, the at least one removable vertical member being coupled to one or more sockets via quick-connect hardware; one or more removable standoffs that operatively couple the at least one outer frame cross member to the longitudinal inner frame parallel members, the one or more removable standoffs being operatively coupled to the at least one outer frame cross member and/or the longitudinal inner frame parallel members via quick-connect hardware; and a bolted connection between one outer frame cross member and the longitudinal inner frame parallel members. The vehicle rack and davit system may include a davit removably coupled to the vehicle rack. The davit may include a first arm removably coupled to the outer frame of the vehicle rack and a second arm pivotally coupled to the first arm via a pivot assembly. The davit may include a first pulley coupled to the pivot assembly and a second pulley coupled to a distal end of the second arm away from the pivot assembly. The davit may also include a winch having a winch line extending from the winch to the first pulley to the second pulley.

In another embodiment, a method for using a davit system coupled to a vehicle rack may include the vehicle rack that may include an outer frame. The outer frame may be operable to mount to a bed side rail of a vehicle, the outer frame may include two longitudinal outer frame parallel members that may be joined by at least one outer frame cross member. The vehicle rack may include at least one inner frame that may be operatively connected to the at least one outer frame cross member, and the at least one inner frame may include two longitudinal inner frame parallel members that may be joined by at least one inner frame cross member. The vehicle rack may include two telescoping members, each telescoping member may be operatively connected to a longitudinal inner frame parallel member. The two telescoping members may be operable to extend from and retract to the two longitudinal inner frame parallel members, such that when extended, the two telescoping members form a substantially parallel rail operable to convey an item for storage on the inner frame. The vehicle rack may include at least two telescoping member guides that may be each operatively connected to each of the two longitudinal inner frame parallel members, and the at least two telescoping member guides may be operable to guide and retain each of the two telescoping members. The at least two telescoping member guides may be further operable to adjust an angle of each of the two telescoping members. The vehicle rack may be mountable to the bed side rail of the vehicle such that the vehicle rack is clear of a tailgate and a bed of the vehicle effective to permit one or more of: use of the tailgate and the bed of the vehicle while the vehicle rack is mounted; and use of a trailer attached to the vehicle without interference from the personal recreational vehicle loaded on the vehicle rack. Each of the two telescoping members may be selectively removable from the at least one inner frame, and each of the two telescoping members may further include a distal end portion and a proximal end portion. The distal end portion may be operable to telescope away from the at least one inner frame and the proximal end portion may be operable to remain operatively connected to the at least one inner frame. The vehicle rack may be configured to permit one or more of: the distal end portions are operatively connected by a wheeled dolly, wherein a height and angle of the wheeled dolly is adjustable, and the two telescoping members, together with the wheeled dolly, are selectively mountable to the at least one inner frame to place the wheeled dolly in a wheels-down orientation or a wheels-up orientation; and the at least one outer frame cross member adjustable in three dimensional space relative to the two longitudinal outer frame parallel members to vary at least one of a length, a height, and a depth of the at least one outer frame cross member relative to the two longitudinal outer frame parallel members. A portion of the at least one inner frame may include a mount for a tensioning device that may include a winch. The method may include mounting a davit to the outer frame of the vehicle rack.

BRIEF DESCRIPTION OF THE DRAWINGS

The accompanying figures, which are incorporated in and constitute a part of the specification, illustrate various example systems and methods, and are used merely to illustrate various example embodiments.

Figure 1B:
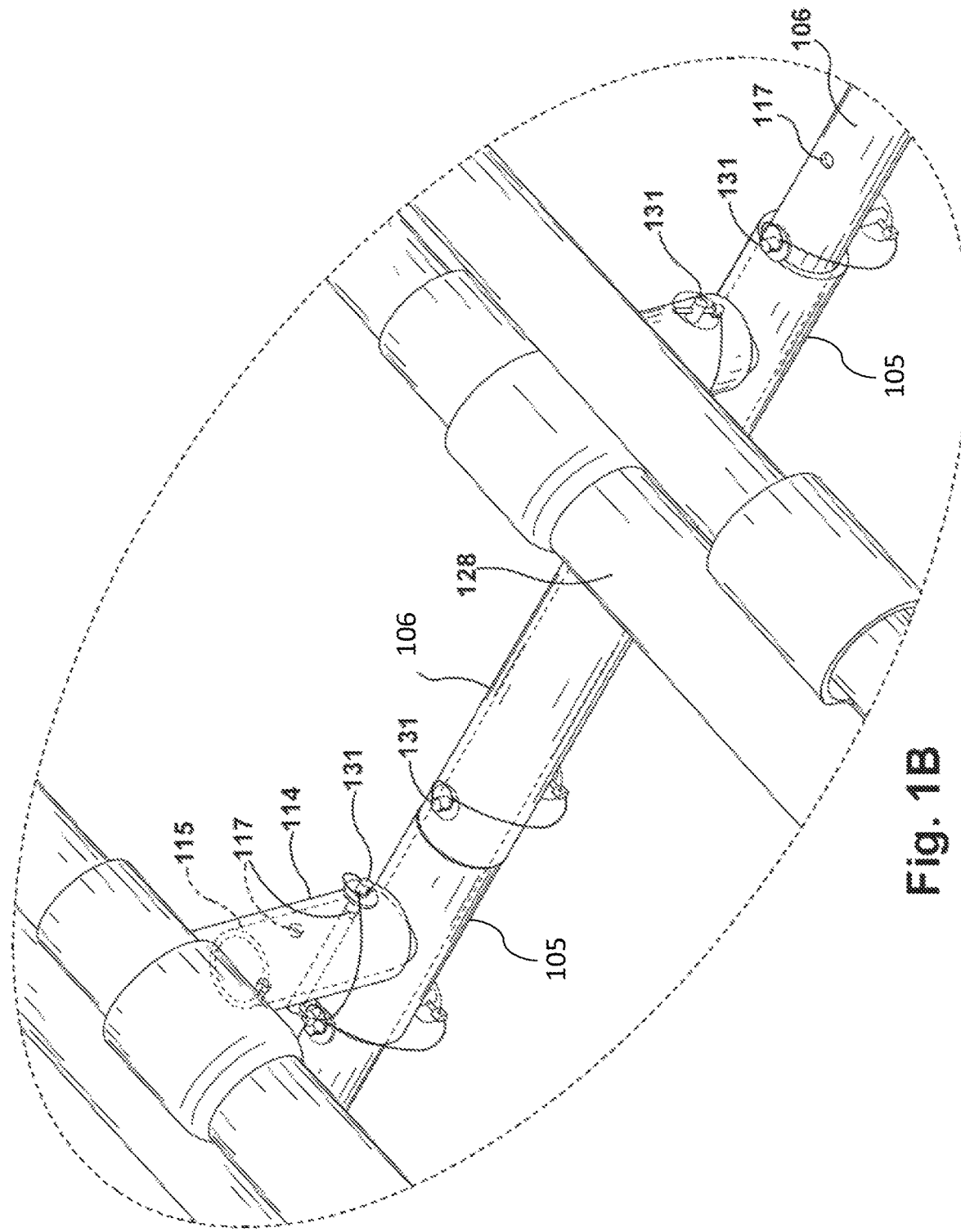
FIG. 1B illustrates certain portions of an example vehicle rack in greater detail.
Figure 1C:
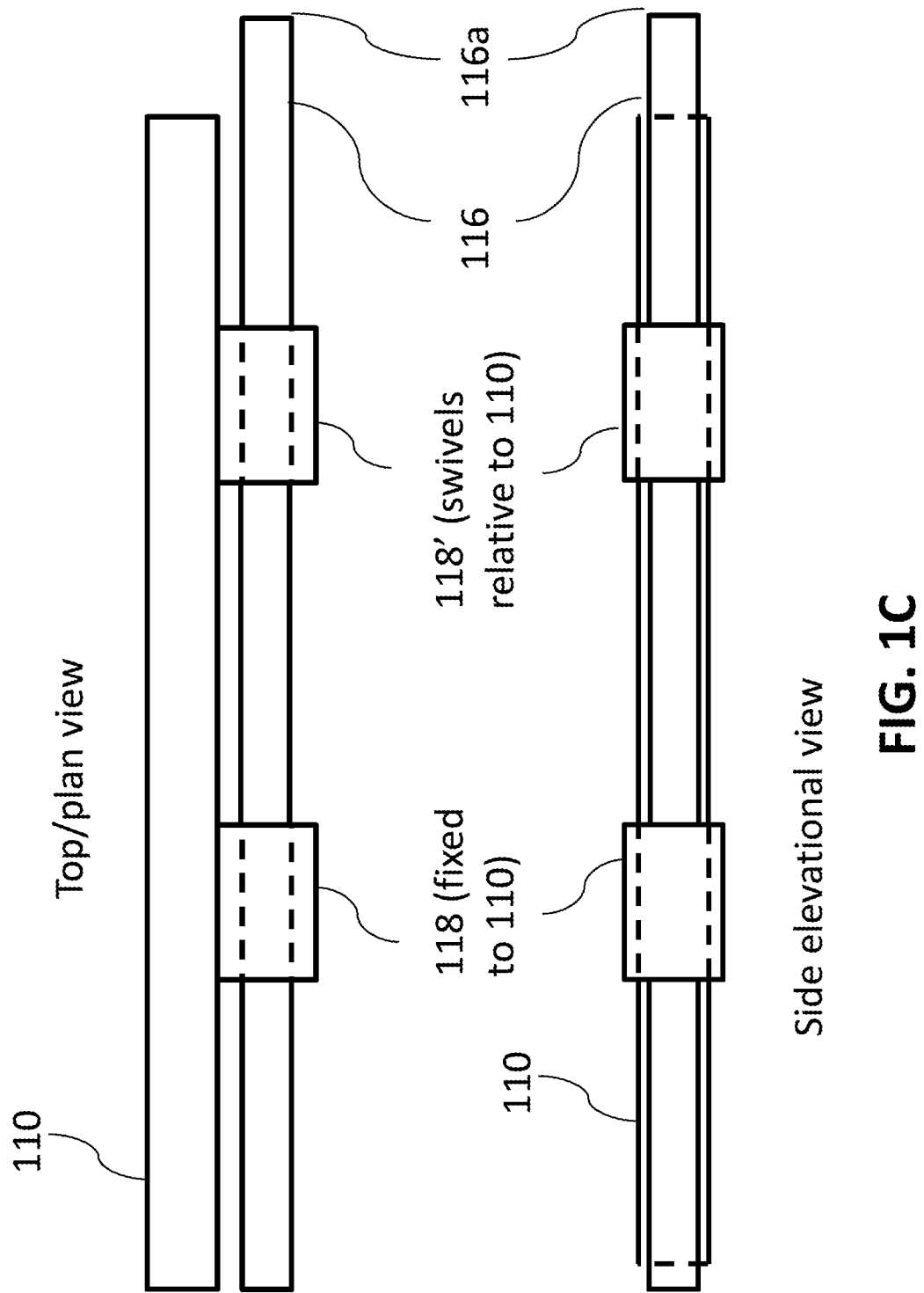
FIG. 1C illustrates certain portions of an example vehicle rack in greater detail, including top/plan and side elevational views of two telescoping members guides disposed on each longitudinal inner frame parallel member.
Figure 1D:
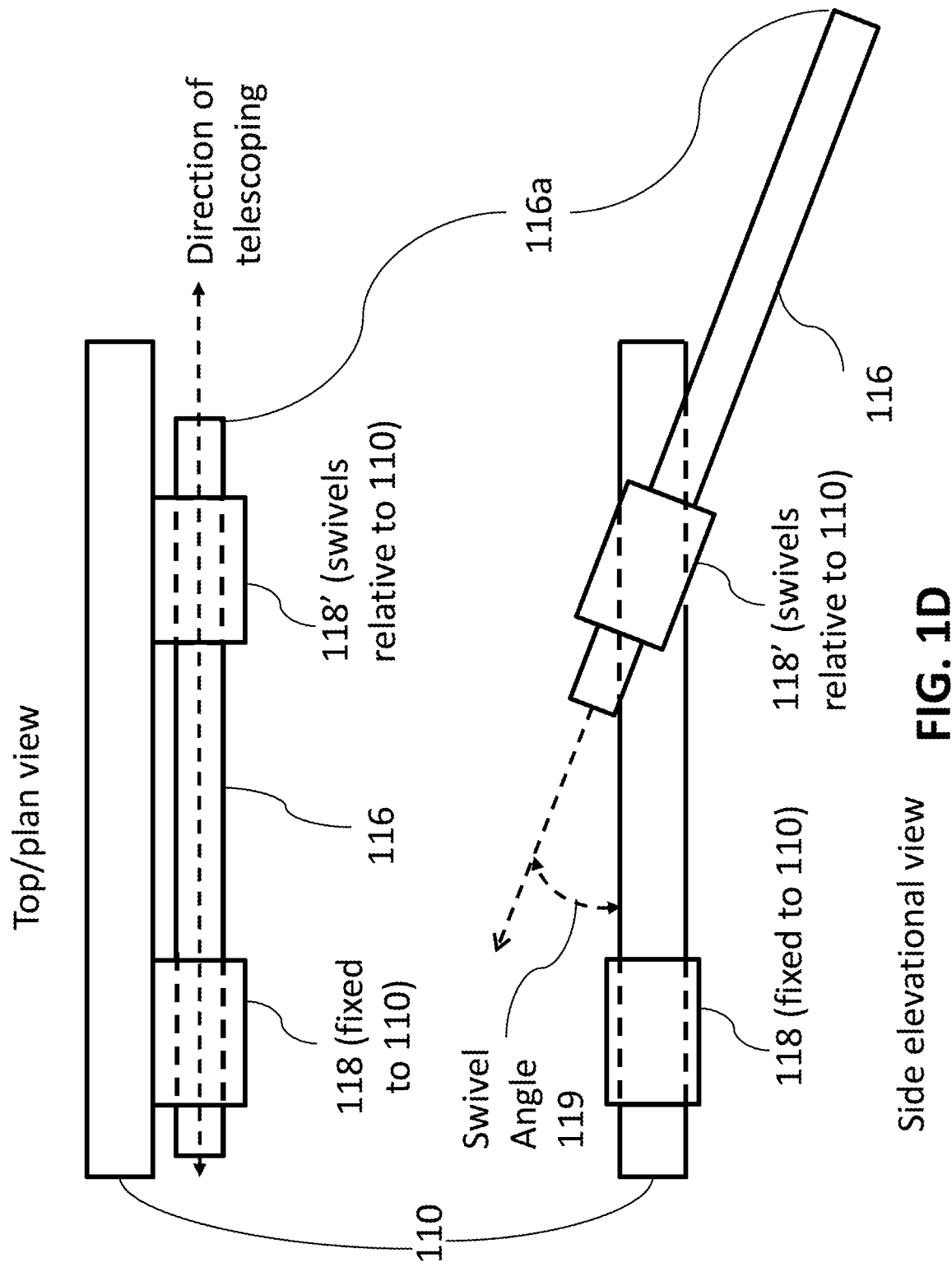
FIG. 1D illustrates certain portions of an example vehicle rack in greater detail, including top/plan and side elevational views of two telescoping members guides, including a telescoping guide that may swivel.
Figure 1E:
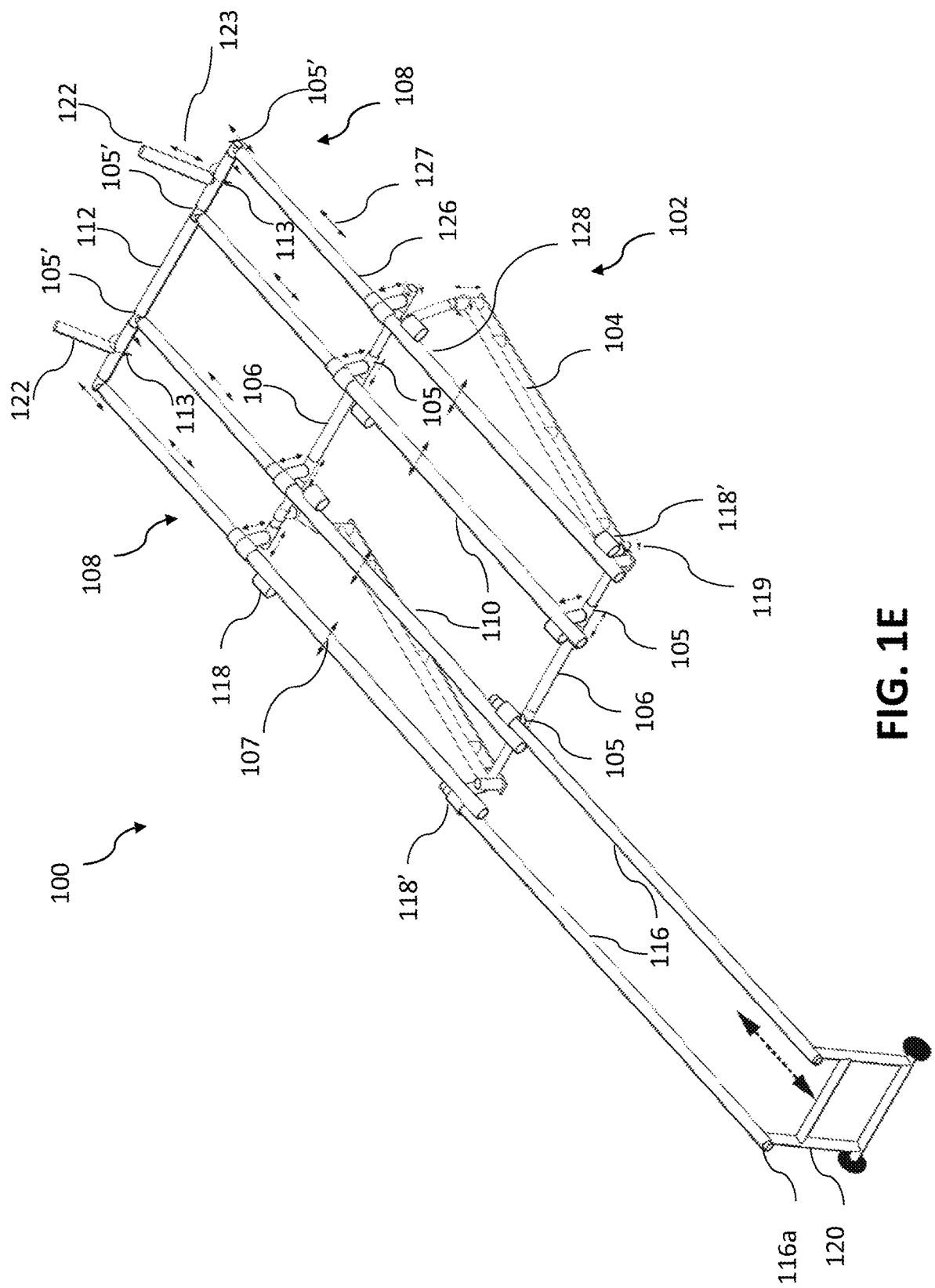
FIG. 1E is a perspective view of an example vehicle rack with two inner frames.

FIG. IF is a perspective view of an outer frame of an exemplary vehicle rack without inner frames, in order to further illustrate aspects of the outer frame and components thereof shown in FIG. 1E.

Figure 1F:
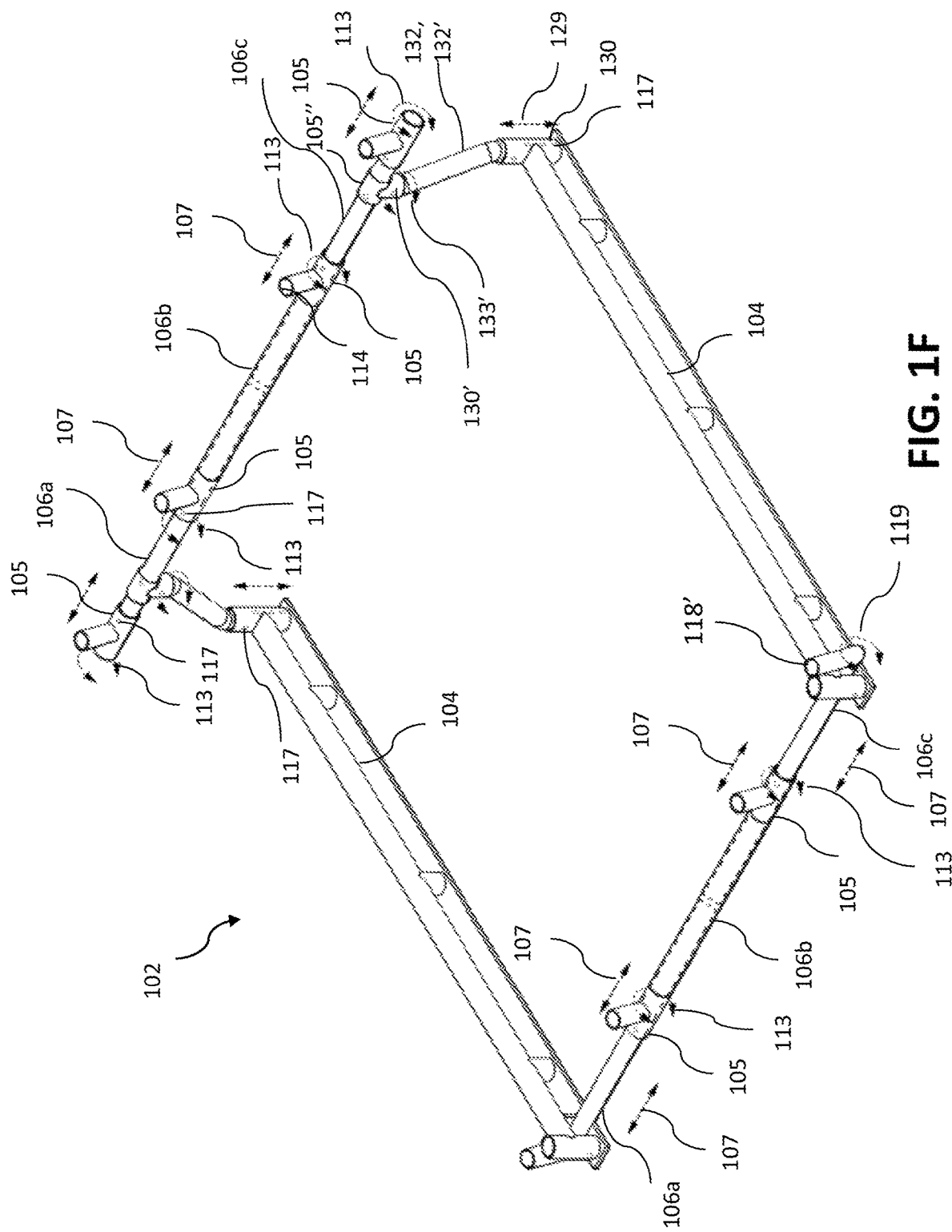
FIG. 1 is a perspective view of an example vehicle rack.
FIG. 1A illustrates certain portions of an example vehicle rack in greater detail.
Figure 1G:
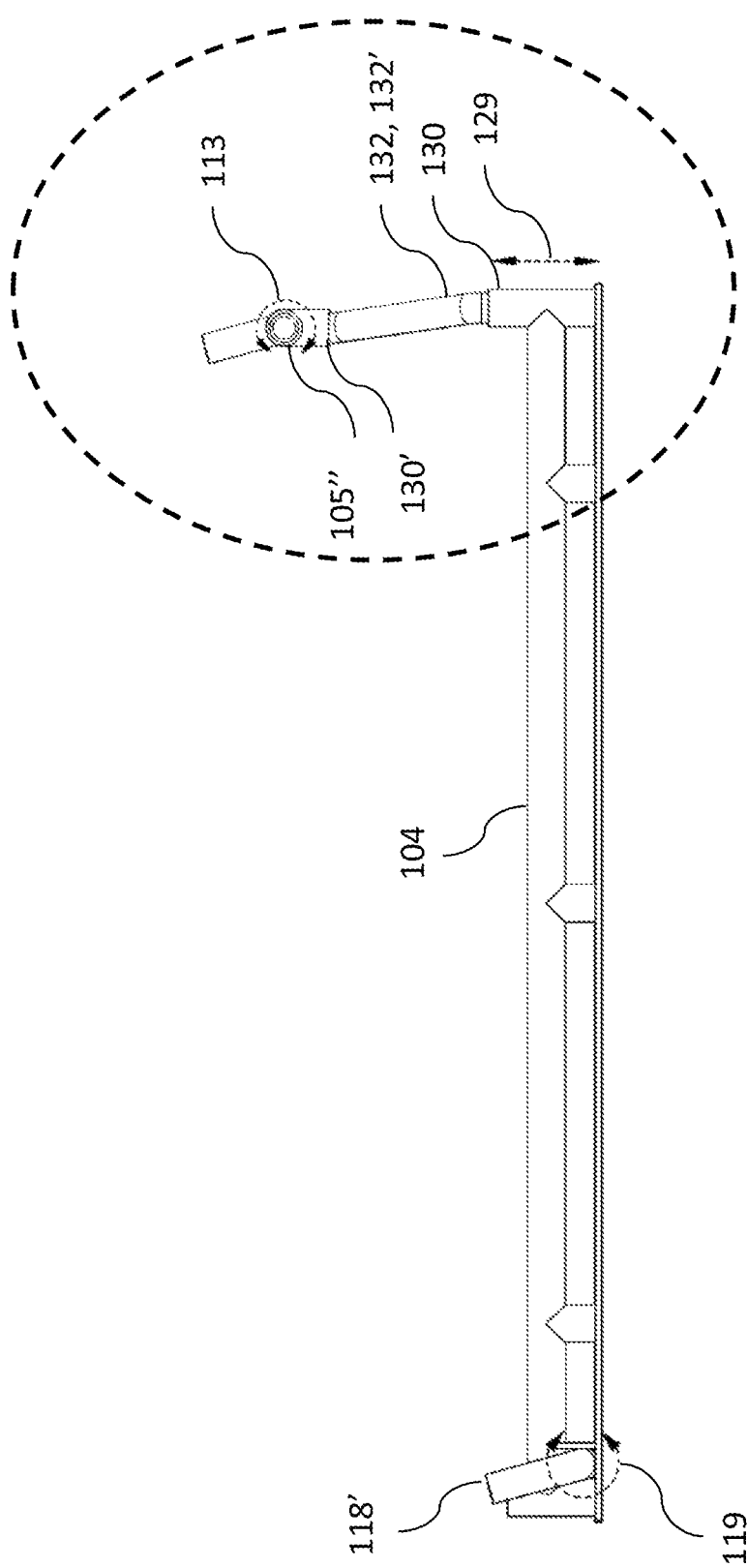

FIG. 1G is a side view of an outer frame of an exemplary vehicle rack without inner frames, in order to further illustrate aspects of the outer frame and components thereof shown in FIG. 1E.

Figure 1H:
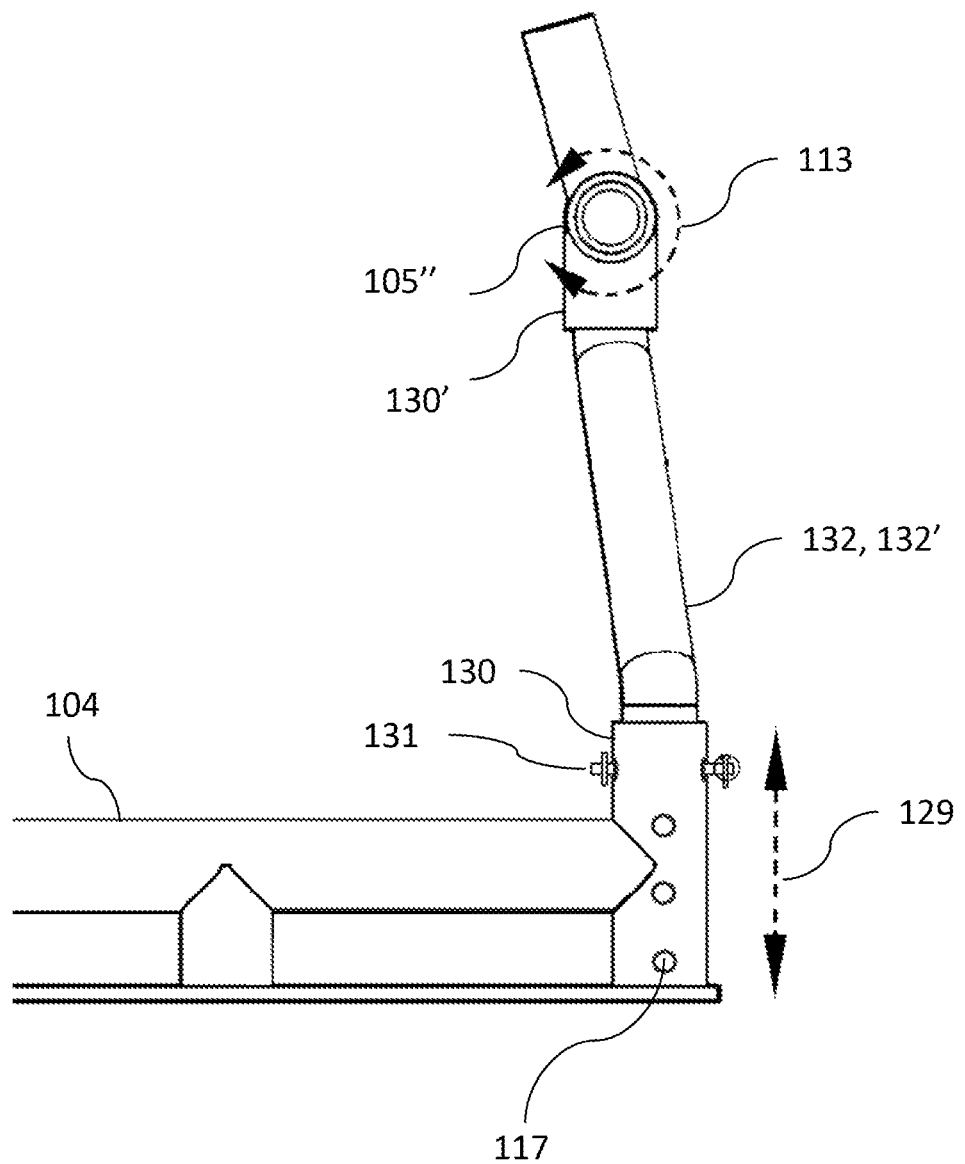

FIG. 1H is an expanded view of the side view of an outer frame of an exemplary vehicle rack without inner frames, in order to further illustrate aspects of the outer frame and components thereof shown in FIG. 1G.

Figure 2:
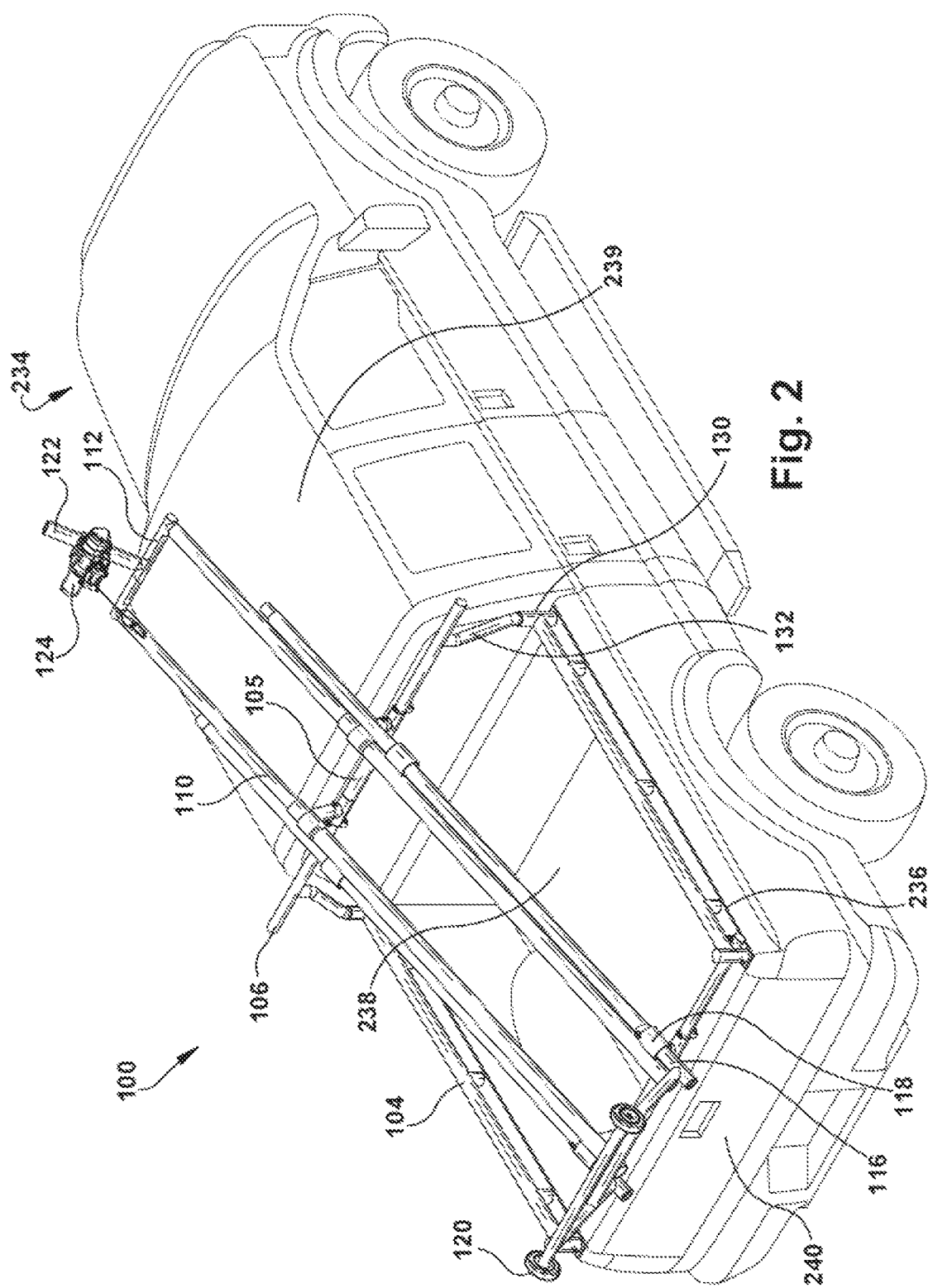

FIG. 2 is a perspective view of an example vehicle rack mounted to a vehicle.

FIG. 3 is a perspective view of an example vehicle rack mounted to a vehicle.

Figure 3A:
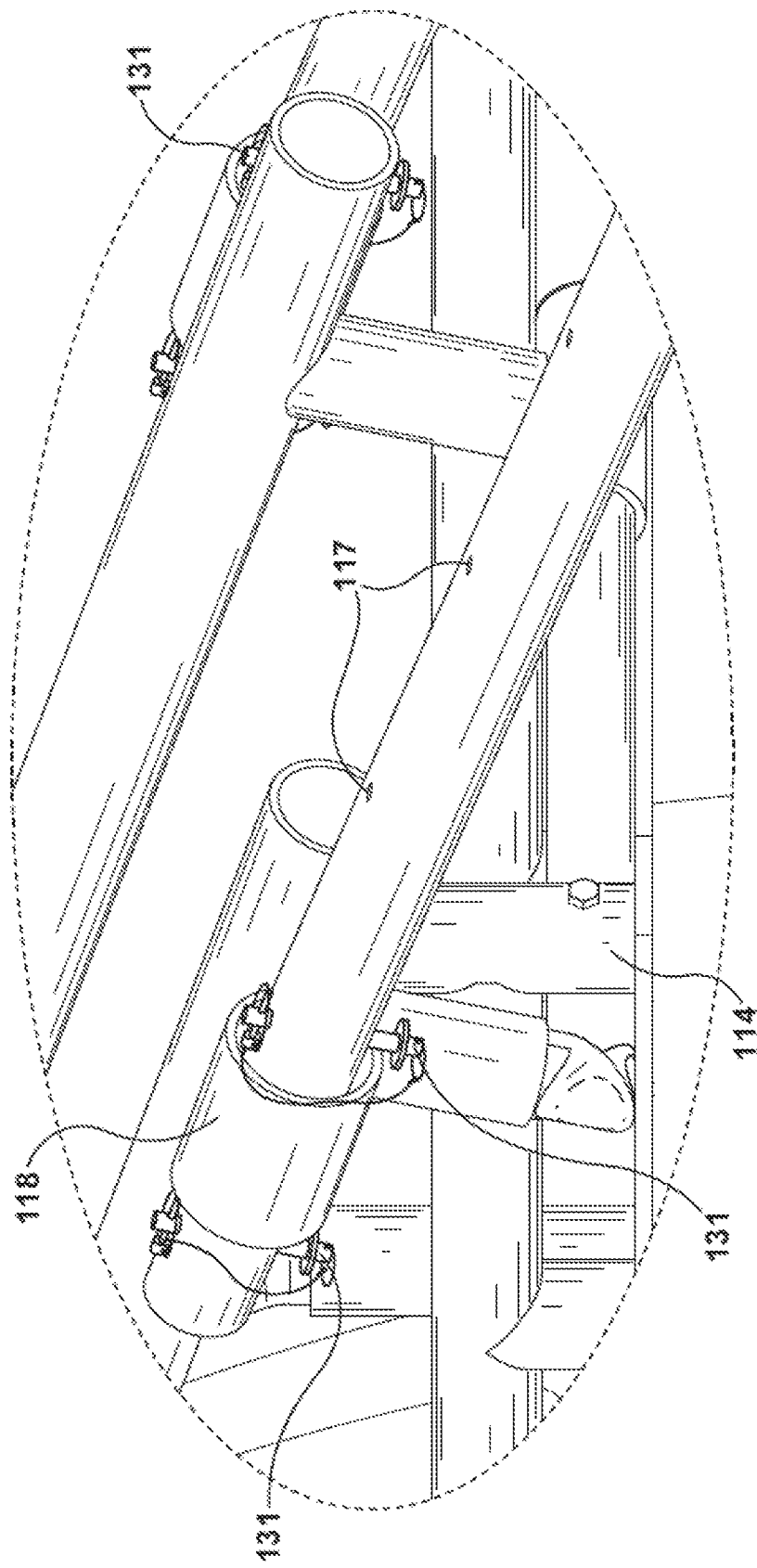

FIG. 3A illustrates certain portions of an example vehicle rack in greater detail.

Figure 4:
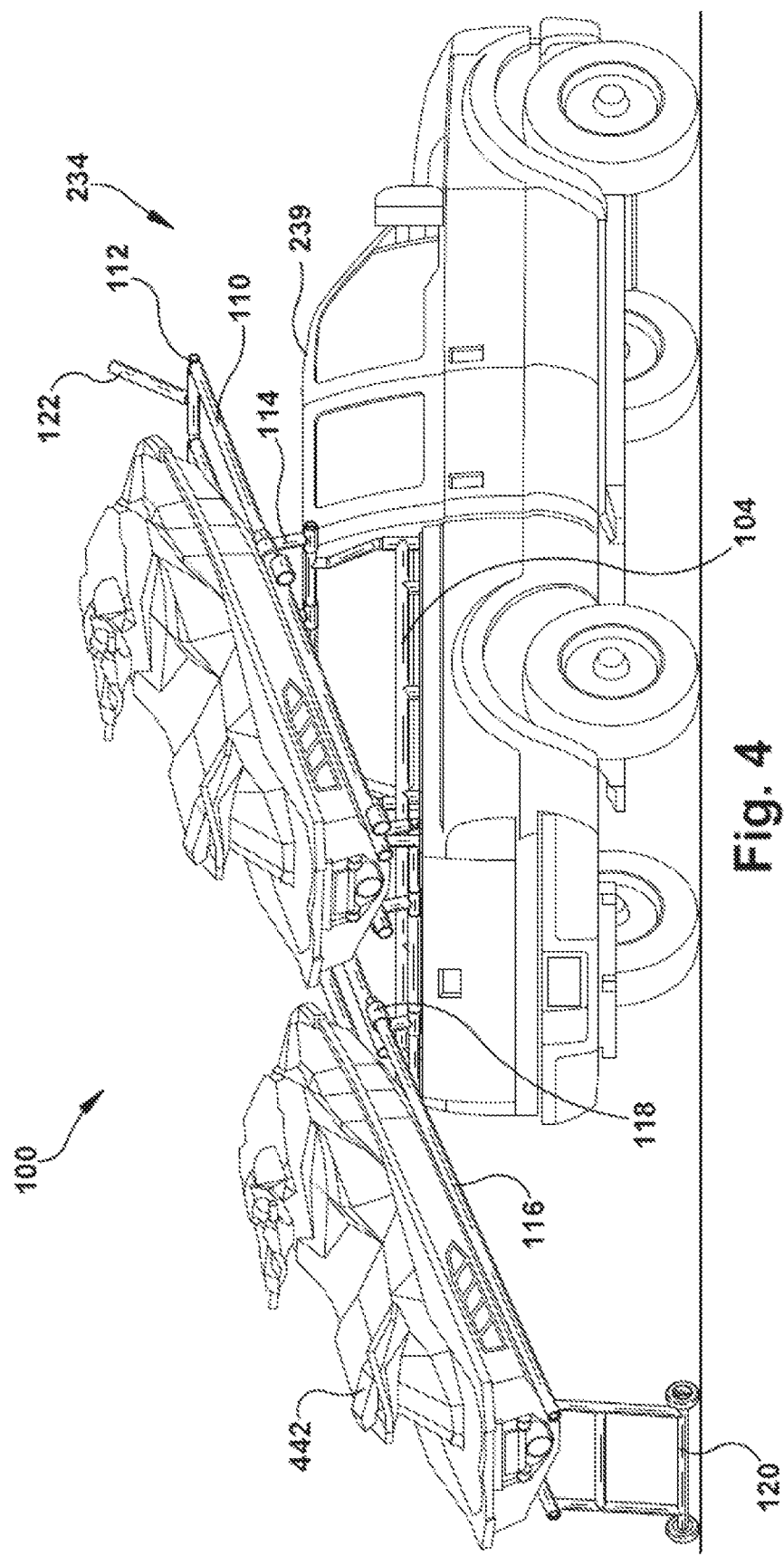

FIG. 4 is a perspective view of an example vehicle rack with personal recreational vehicles mounted to a vehicle.

Figure 5:
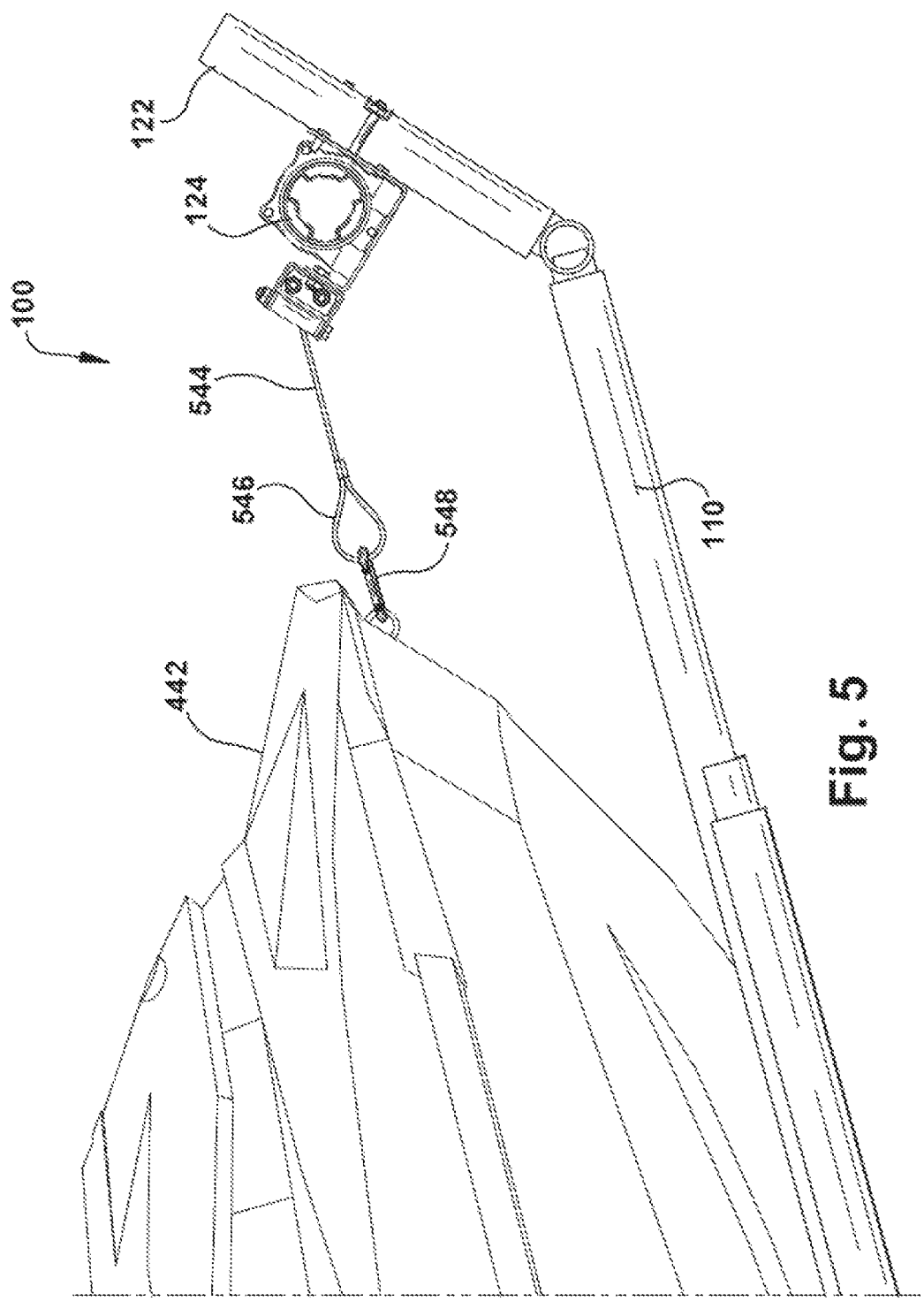

FIG. 5 is a side view of an example vehicle rack with a tensioning device.

Figure 6:
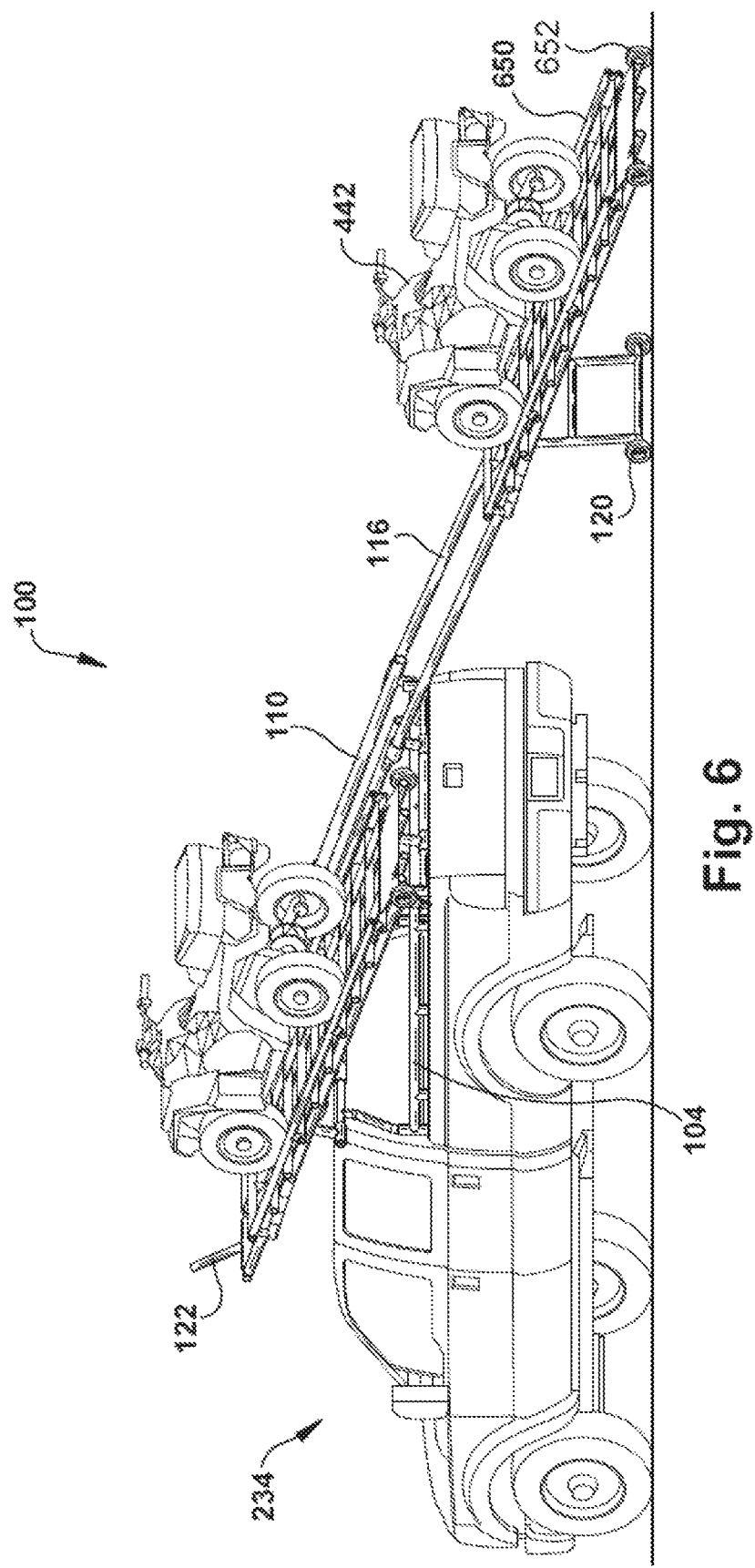

FIG. 6 is a perspective view of an example vehicle rack with vehicle platforms mounted to a vehicle.

Figure 7:
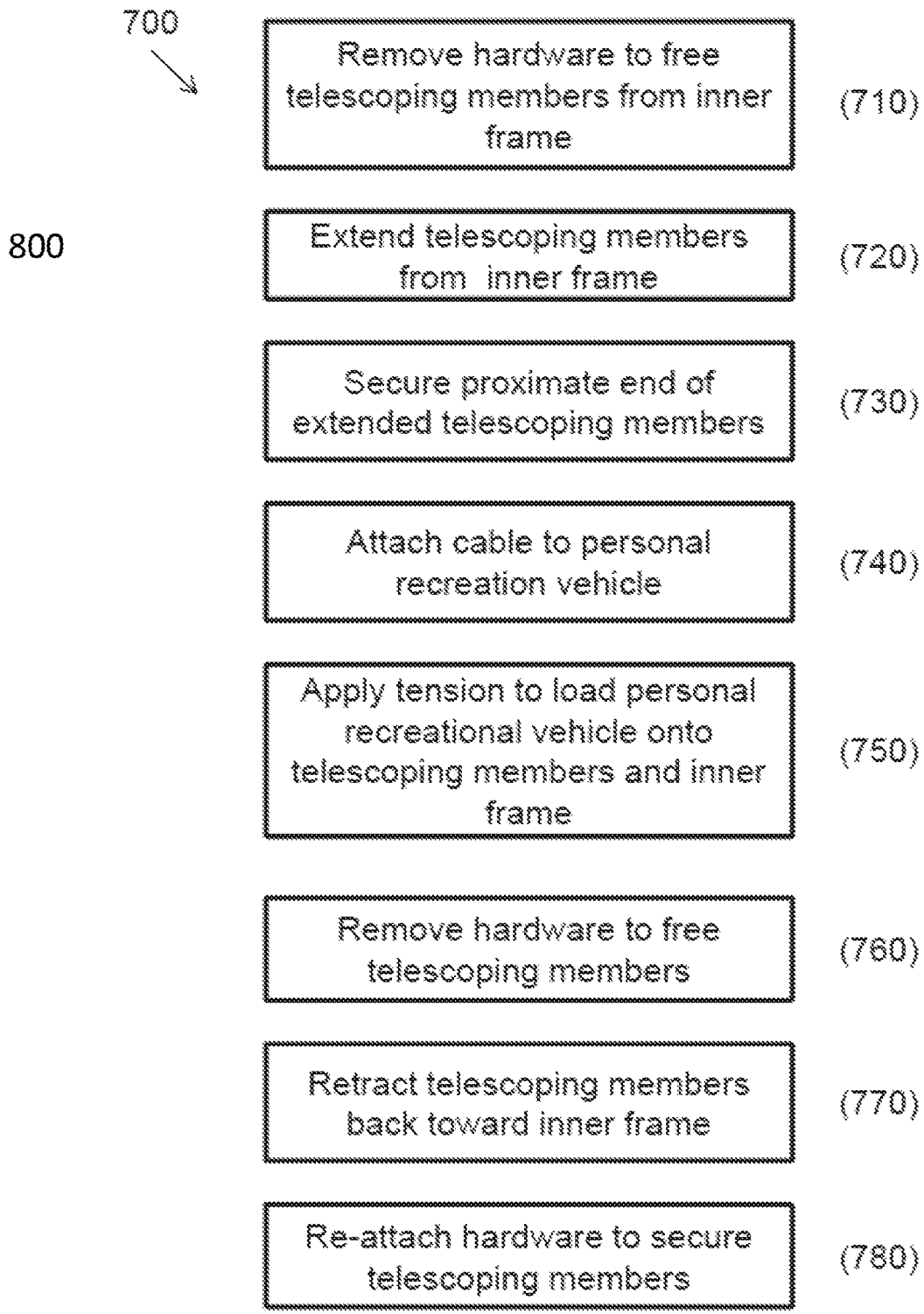

FIG. 7 is a flow chart of an example method for using a vehicle rack.

Figure 8:
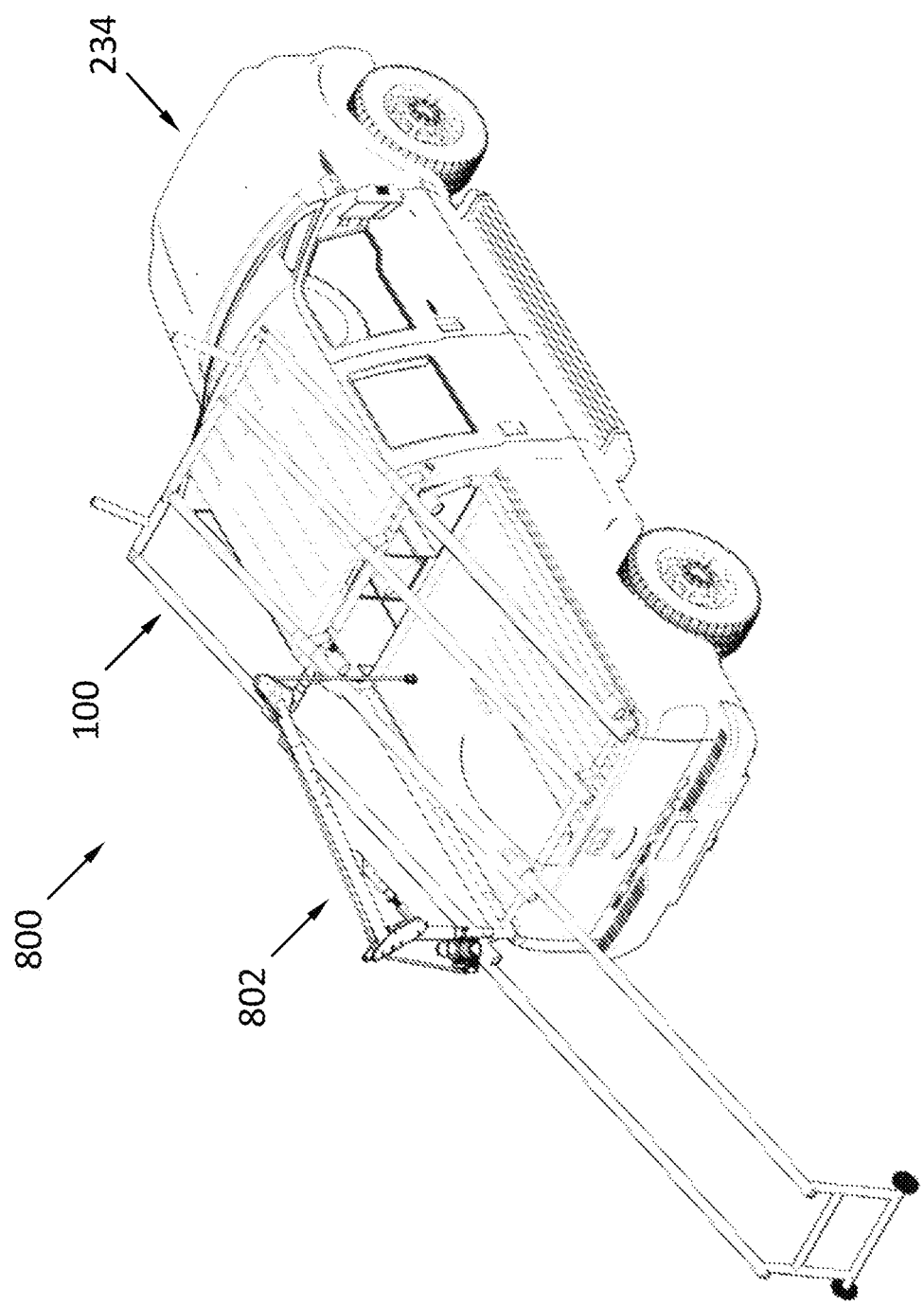

FIG. 8 is a perspective view of an example vehicle rack and davit system mounted to a vehicle.

Figure 9:
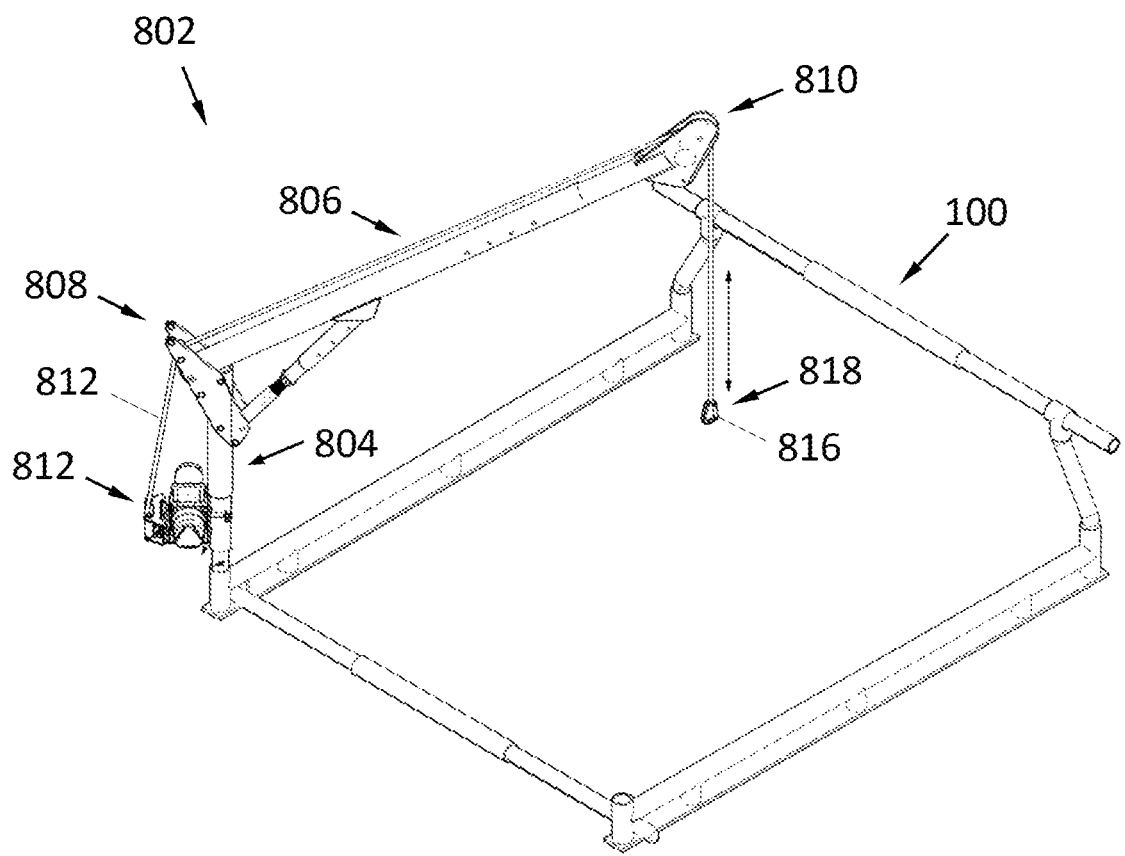

FIG. 9 illustrates certain portions of an example vehicle rack and davit system in greater detail.

Figure 10:
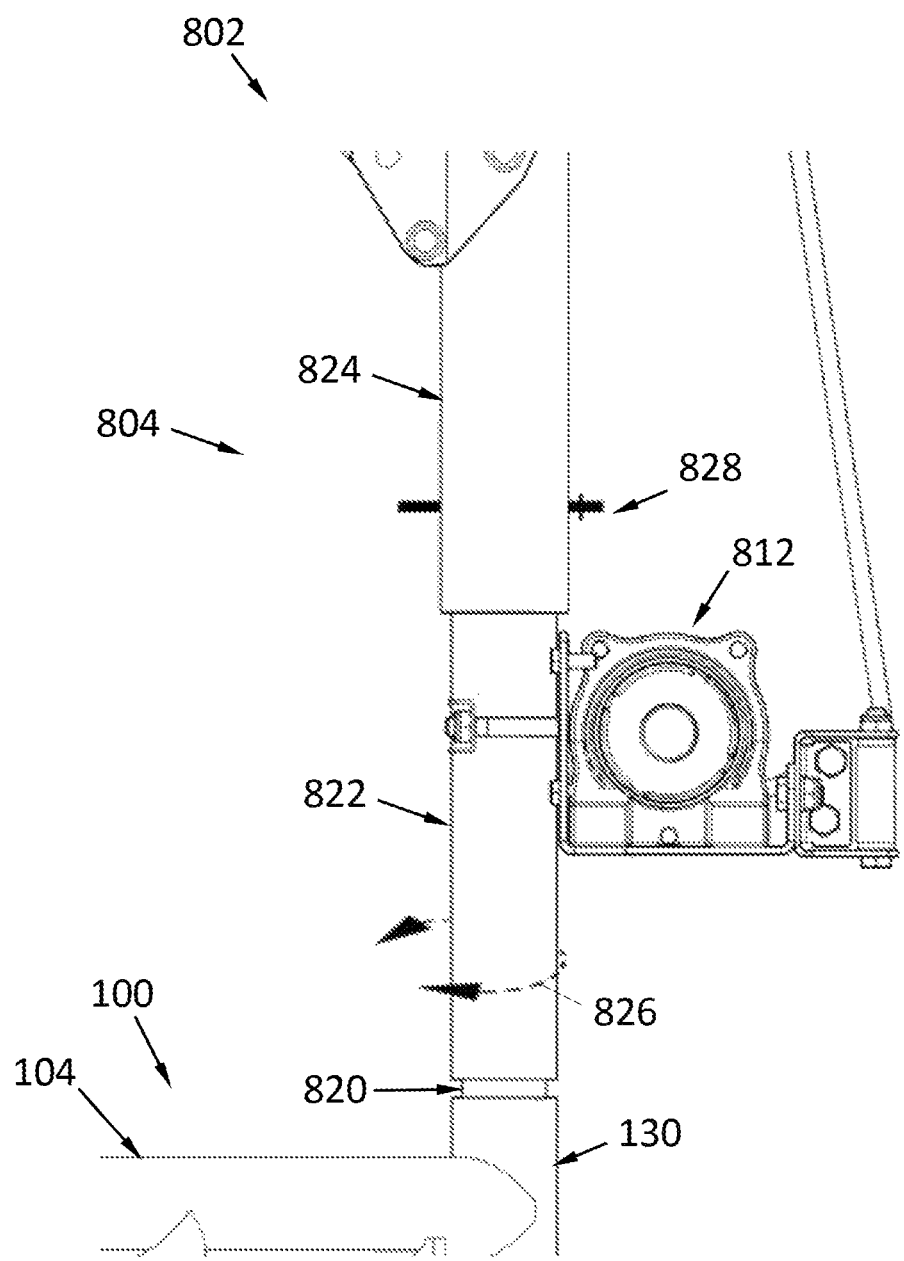

FIG. 10 illustrates certain portions of an example vehicle rack and davit system in greater detail.

Figure 11:
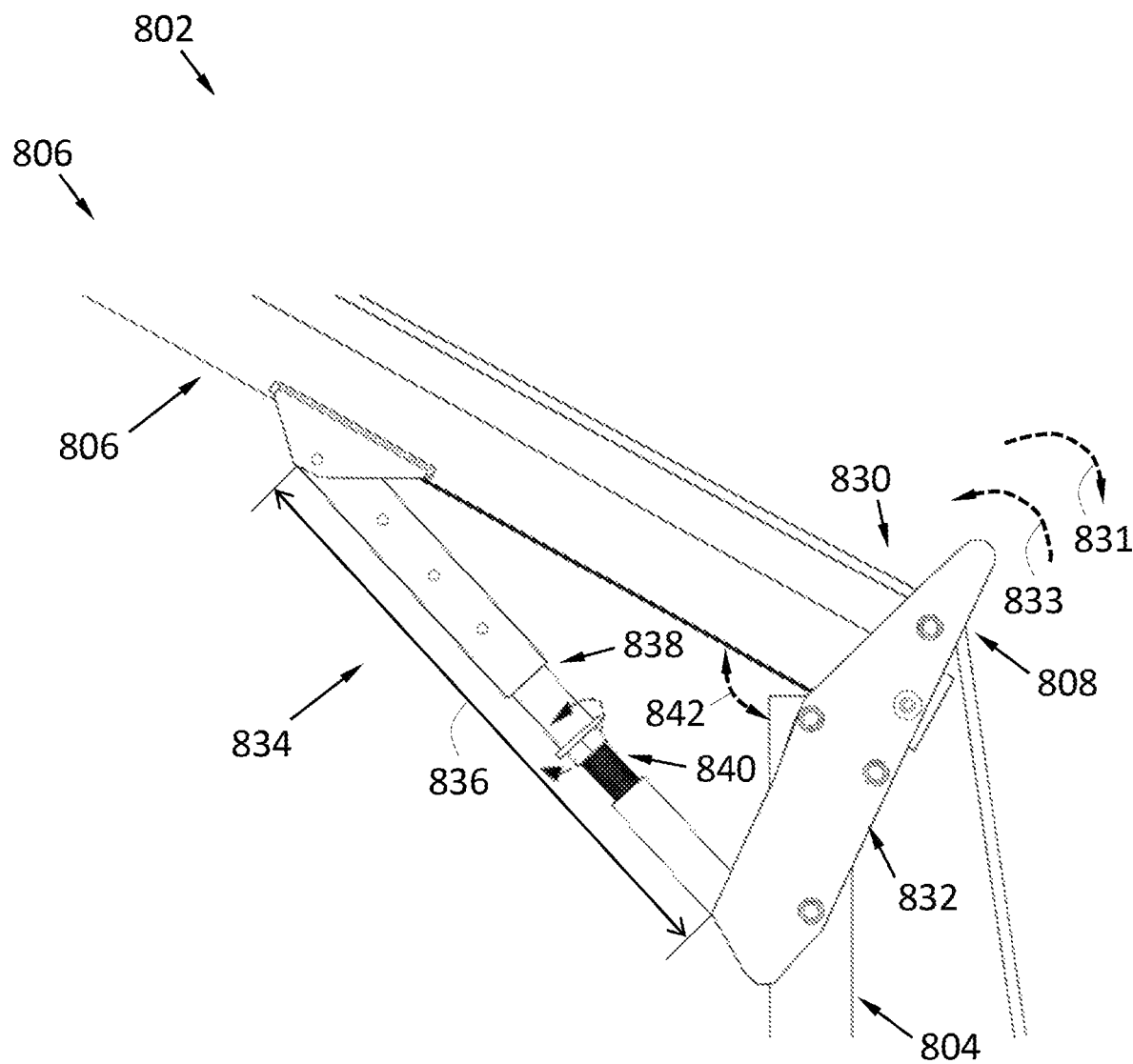

FIG. 11 illustrates certain portions of an example vehicle rack and davit system in greater detail.

Figure 12:
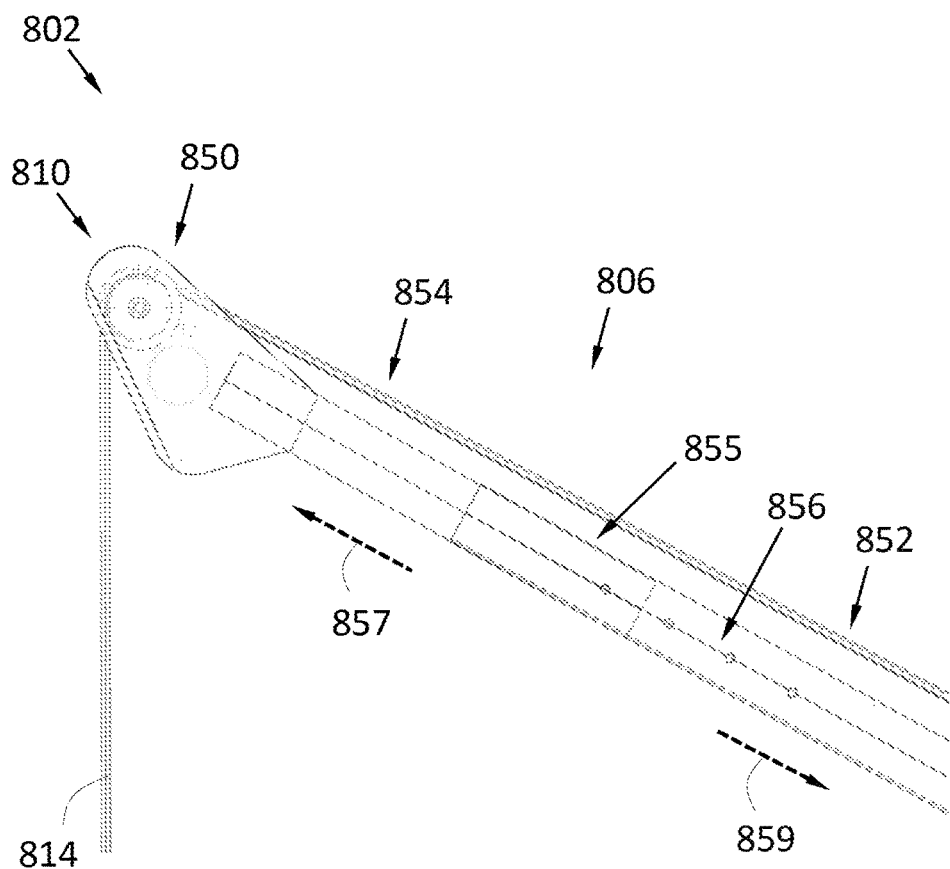

FIG. 12 illustrates certain portions of an example vehicle rack and davit system in greater detail.

Figure 13:
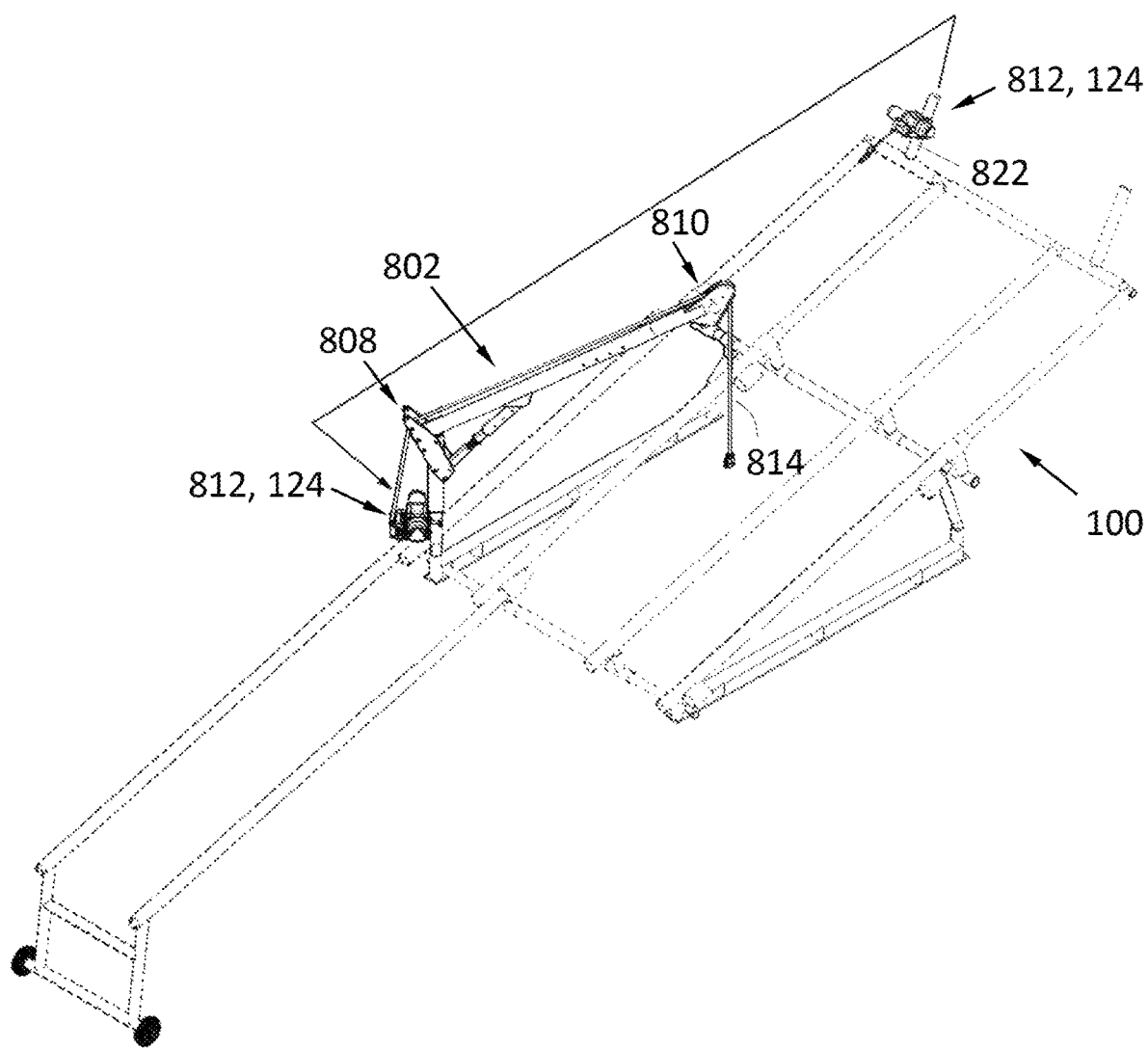

FIG. 13 illustrates removing a winch from an example vehicle rack and coupling the winch to a davit.

Figure 14:
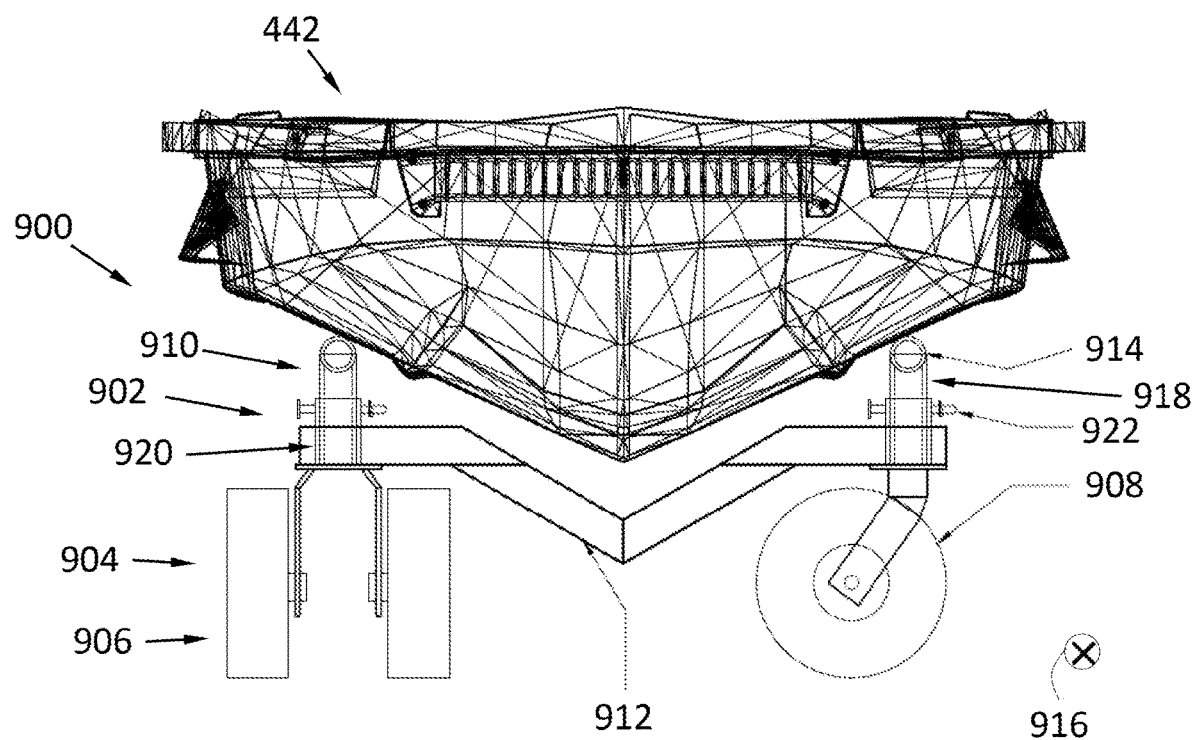

FIG. 14 is a perspective view of an example moving dolly carrying a personal vehicle.

Figure 15:
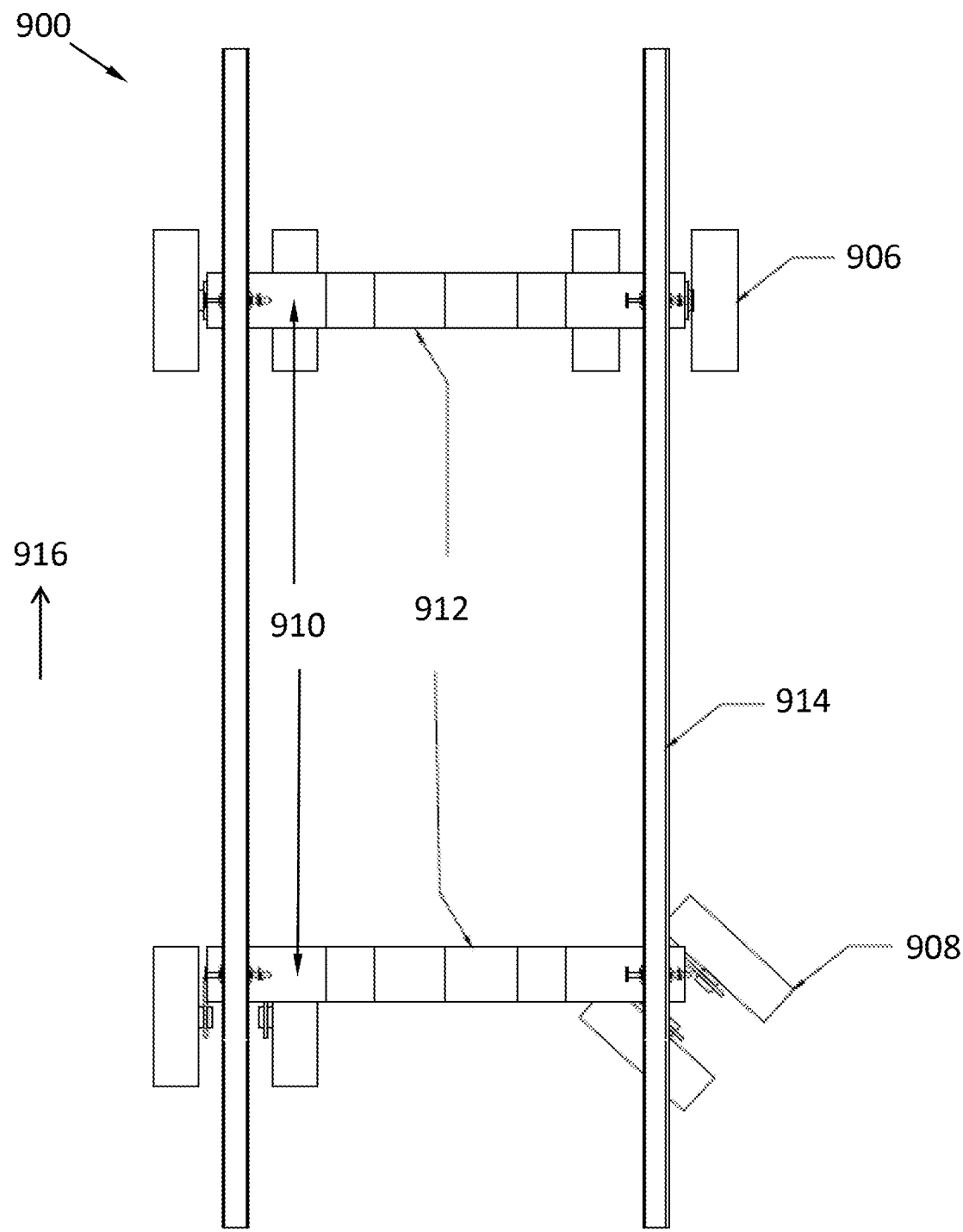

FIG. 15 is a top view of an example of the moving dolly of FIG. 14.

DETAILED DESCRIPTION

FIG. 1 illustrates a perspective view of vehicle rack 100, while FIGS. 1A and 1B show certain portions of vehicle rack 100 in greater detail. Vehicle rack 100 may be mounted to a vehicle such as a trailer or vehicle with a cargo area to convey one or more personal recreational vehicles such as a snowmobile, personal watercraft, ATV, and like vehicles, and to provide an easy loading/unloading of personal recreational vehicles.

Vehicle rack 100 may include an outer frame 102 and one or more inner frames 108.

Outer frame 102 may be mounted to a trailer or motor vehicle to load/unload and convey one or more personal recreational vehicles. Outer frame 102 may further include at least two longitudinal outer frame parallel members 104. Longitudinal outer frame parallel members 104 may be permanently affixed to a vehicle or trailer or selectively affixed to a vehicle or trailer such that longitudinal outer frame parallel members 104 may be attached to or removed from a vehicle with a tool and a hardware. In one embodiment, longitudinal outer frame parallel members 104 of outer frame 102 may be the only portion of vehicle rack 100 attached to a vehicle. Outer frame 102 may also include at least one outer frame cross member 106 which interconnects and may be operatively connected to each longitudinal outer frame parallel member 104. One or more points of outer frame cross member 106 may be operatively connected to one or more inner frames 108.

Inner frame 108 may be operable to retain and convey a personal recreational vehicle. In one embodiment, vehicle rack 100 conveys one personal vehicle on inner frame 108. In another embodiment, vehicle rack 100 conveys two personal vehicles on two inner frames 108. Each inner frame 108 includes two longitudinal inner frame parallel members 110 operatively connected to one or more inner frame cross members 112. Inner frame 108 may connect directly to outer frame cross member 106 or inner frame 108 may connect to outer frame cross member via one or more inner frame standoffs 114. Inner frame 108 may operatively connect to telescoping members 116.

Telescoping members 116 may operatively connect to inner frame 108. In one embodiment a telescoping member 116 may be adjacent to longitudinal inner frame parallel member 110 and secured by one or more telescoping member guides 118 operatively connected to longitudinal inner frame parallel members 110. In another embodiment, telescoping members 116 fit within all or portions of longitudinal inner frame parallel member 110 and extend therefrom. A distal end portion 116a of telescoping members 116 may extend away from inner frame 108 to facilitate in a loading/unloading of a personal recreational vehicle. A proximal end portion 116b of telescoping members 116 may remain in contact with inner frame 108 and connect to one or more telescoping member guides 118 to form a secure connection between telescoping members 116 and inner frame 108. An adjustable dolly 120 may interconnect distal ends 116a of telescoping members 116. In some embodiments, adjustable dolly 120 may support telescoping members 116 when loading and unloading a personal recreational vehicle by providing one or more support wheels to contact the ground, as shown. In some embodiments, the adjustable dolly 120 may be configured with one or more legs, or a combination of one or more legs and one or more wheels (not shown). In some embodiments, the adjustable dolly 120 may be adjustable between a support-up position (e.g., wheels up) and a support-down position (e.g., wheels down) via any suitable mechanisms, such as a hinge, a selective mount, or a combination thereof. The support-up position refers to the one or more wheels and/or legs of the adjustable dolly 120 being in a stowed position and oriented away from the ground. The support-down position refers to the one or more wheels and/or legs of the adjustably dolly 120 being in a deployed position and oriented toward the ground.

One or more telescoping members guides 118 disposed on each longitudinal inner frame parallel member 110 secure telescoping members 116 adjacent to inner frame 108 and secure telescoping members 116 in both a retracted and extended position. In one embodiment, at least one distal telescoping member guide 118' (FIGS. 1C and 1D) for each telescoping member 116 may swivel to adjust an angle 119 of telescoping member 116. Distal telescoping member guide 118' may use detents or other mechanical restrictions to vary a swivel angle 119 in fixed intervals. Distal telescoping member guide 118' may have a locking capability to fix a swivel angle 119. Varying the angle 119 of telescoping member 116 using distal telescoping member guide 118' may allow vehicle rack 100 to load and unload personal recreational vehicles in a variety of locations. For example, distal telescoping member guides 118' may swivel to vary angles 119 of telescoping members 116, and height and angle of distal end 116a of telescoping members 116, e.g., including dolly 120, may be adjusted to provide firm contact with a ground or lake bottom at the variety of locations so as to load and unload a personal recreation vehicle.

An angle of both inner frame 108 and telescoping members 116 may be also adjusted by varying a height of outer frame cross member 106 or height of inner frame 108 relative to outer frame cross member 106 via one or more standoffs 114. Height of outer frame cross member 106 may be varied by adjusting a height of vertical member 132. Vertical member 132 may fit within socket 130 on longitudinal outer frame parallel member 104 and vertical member 132 may be selectively secured within socket 130. In one embodiment, vertical member 132 may be an adjustable component allowing a height of vertical member 132 to be varied. In another embodiment, vertical member 132 may be a fixed height modular component that may be swapped out for a vertical member 132 of a different height depending on need and function of vehicle rack 100. In one embodiment, vertical member 132 may be selectively secured to socket 130 by a quick-connect hardware (not shown) such as a hitch pin, linchpin, cotter pin and the like. In another embodiment, height and angle of inner frame 108 and thus telescoping members 116 may be varied by varying a height between inner frame 108 and outer frame cross member 106 via one or more standoffs 114. In one embodiment, standoffs 114 may be substituted for a standoff 114 of a different height depending on need and function of vehicle rack 100. With reference to FIG. 1B, in another embodiment, standoff 114 fits over a telescoping member of a smaller width 115 and standoff 114 may be adjusted relative to telescoping member of smaller width 115 to vary height and angle of vehicle rack 100. In this embodiment, standoff 114 and telescoping member of smaller width 115 may have one or more apertures 117 therethrough. When a desired height of standoff 114 relative to telescoping member of smaller width 115 is achieved, the apertures 117 through both standoff 114 and telescoping member of smaller width 115 may be aligned and quick-connect hardware 131 may be inserted through apertures 117 to lock height of standoff 114 relative to telescoping inner member of smaller width 115 into place, and thus lock height of vehicle rack 100 in place. Thus, standoff 114 may be adjustable to vary a height between inner frame 108 and outer frame cross member 106 to vary a height and angle of inner frame 108 and telescoping members 116.

Outer frame cross member 106 may fit within and pass through sleeve 105. In one embodiment, sleeve 105 can vary in length, such that placement of sleeve 105 between telescoping inner members 115 can vary a width between each longitudinal inner frame parallel member 110, thus allowing for an adjustable width of inner frame 108. In this embodiment, one sleeve 105 may be substituted with another sleeve 105 of greater length to provide a wider inner frame 108. In another embodiment, cross member 106 may be discontinuous, such that cross member 106 includes a left portion and a right portion secured together by sleeve 105. In this embodiment, sleeve 105 includes apertures 117 therethrough which correspond to apertures 117 on cross member 106. In this embodiment, the complete width of vehicle rack 100 may be varied by the interconnection between different portions of cross member 106 and sleeve 105 using quick connect hardware 131 secured through apertures 117 in both cross member 106 and sleeve 105 such that vehicle rack 100 may be varied to fit on different vehicles.

Inner frame 108 may also include tensioning device mount 122. Tensioning device mount 122 may be operable to mount a tensioning device 124 used for loading/unloading a personal recreational vehicle to and from inner frame 108 via telescoping members 116. In one embodiment, tensioning device 124 may be selectively removable from tensioning device mount 122 to add and remove a tensioning device 124. Selectively removable tensioning device 124 may be added and removed to one or more tensioning device mounts 122 on inner frames 108. In another embodiment, tensioning device 124 may be permanently mounted to tensioning device mount 122 with each tensioning device mount 122 requiring a tensioning device 124. In one embodiment, tensioning device 124 may be a manual device which requires physical energy from a user, for example by manually cranking a reel, to add tension to a cable, rope, or chain attached to a personal recreational vehicle to load/unload a personal recreational vehicle. In another embodiment, tensioning device 124 runs a motor from a power supply to provide tension while loading/unloading a personal recreational vehicle. A motor actuated tensioning device 124 may run from an external power supply such as a vehicle battery to power an electric motor or use another power source like a vehicles engine to actuate tensioning device 124 via a power take off (PTO)/driveshaft, pneumatics, or hydraulics to provide tension. Tensioning device 124 may be remote actuated via a remote control. In one embodiment, using a remote control to actuate tensioning device 124 assists a user in loading/unloading a personal recreational vehicle on/off of telescoping members 116.

Referring to FIG. 1E, a perspective view of vehicle rack 100 with two inner frames 108 is illustrated. In addition to illustrating the various features described above, FIG. 1E gives an overall view of various translational and rotational adjustment motions provided by the features described above and in further detail below.

For example, longitudinal inner frame parallel members 110 (and portions 126 and 128) may be independently be adjusted laterally in direction 107 via adjustments between outer frame cross member 106 and sleeves 105, and inner frame cross member 112 and pass through sleeves 105', as follows.

Outer frame cross member 106 may fit within and pass through sleeves 105. In one embodiment, sleeves 105 can vary in length, such that placement of sleeves 105 between telescoping inner members 115 can vary a width between each longitudinal inner frame parallel member 110, thus allowing for an adjustable width of inner frame 108. In this embodiment, one sleeve 105 may be substituted with another sleeve 105 of greater length to provide a wider inner frame 108. In another embodiment, cross member 106 may be discontinuous, such that cross member 106 includes two or more portions secured together by sleeves 105. In this embodiment, sleeves 105 may include features (e.g., apertures) 117 and corresponding features (e.g., apertures or detents) 117 on cross member 106. In this embodiment, the width of vehicle rack 100 may be varied by the interconnection between different portions of cross member 106 and sleeve 105 using quick connect hardware 131 secured according to features 117 in both cross member 106 and sleeve 105 such that vehicle rack 100 may be varied to fit on different vehicles. In one embodiment, sleeves 105 may fit over cross member 106 and may be adjusted laterally in direction 107 along cross member 106. For example, referring to FIGS. 1A and 1B, sleeves 105 may being fixed in defined positions using quick connect hardware 131 secured through apertures 117 in both cross member 106 and sleeve 105.

Likewise, longitudinal inner frame parallel members 110 (and portions 126 and 128) may be correspondingly adjusted laterally in direction 107 along inner frame cross member 112. Inner frame cross member 112 may fit within and pass through sleeve 105'. In one embodiment, sleeve 105' can vary in length, such that placement of sleeve 105' between telescoping inner members 115 can vary a width between each longitudinal inner frame parallel member 110, thus allowing for the adjustable width of inner frame 108. In this embodiment, one sleeve 105' may be substituted with another sleeve 105' of greater length to provide a wider inner frame 108. In another embodiment, inner frame cross member 112 may be discontinuous, such that inner frame cross member 112 includes one or more portions secured together by sleeves 105'. In this embodiment, sleeve 105' includes features (e.g., apertures) 117 that may correspond to features (e.g., apertures or detents) 117 on inner frame cross member 112. In this embodiment, the complete width of vehicle rack 100 may be varied by the interconnection between different portions of inner frame cross member 112 and sleeve 105' using quick connect hardware 131 secured at features 117 such that vehicle rack 100 may be varied to fit on different vehicles. In one embodiment, sleeves 105' may fit over cross member 112 and may be adjusted laterally in direction 107 along cross member 112. Further, in some embodiments, where inner frame cross member 112 includes one or more portions secured together by sleeves 105', the one or more portions of cross member 112 may be rotated, e.g., in rotational direction 113 to adjust the position of tensioning device mount 122. In some embodiments, tensioning device mount 122 may be adjustable in length along direction 123, for example, according to an internal telescoping mechanism (not shown). In various embodiments herein, quick connect hardware, such as 131, may be alternatively configured as a set screw, a spring loaded button, and the like. For example, in a set screw configuration, quick connect hardware such as 131 may be secured against another member such as cross member 112, either via a feature such as 117, which may be configured as an aperture or detent in cross member 112, or in the absence of a feature such as 117.

In another embodiment, an upper portion of inner frame 108 may translate longitudinally along direction 127 as follows. Portion 126 of inner frame 108 may have a first width/diameter which may allow portion 126 to telescope within portion 128 having a second width/diameter larger than first width/diameter of portion 126. Portion 126 may be secured within portion 128 by quick connect hardware, a set screw, a spring loaded button, and the like (not shown). This general telescoping mechanism between portion 126 and portion 128 is exemplary of telescoping mechanisms that may be implemented elsewhere in vehicle rack 100 but, for reasons of clarity of drawing, are not shown in each instance of the drawing where such telescoping mechanisms may be implemented in various embodiments.

In various embodiments, the inner frame 108 may be coupled to the outer frame 102 at various points by standoffs 114 coupled to sleeves 105/105'. The standoff distance provided by standoffs 114 may be varied, for example, by replacing standoffs 114 of one length with those of another length.

FIG. 1F shows a perspective view and FIG. 1G a side view, each of outer frame 102, without inner frames 108, in order to further illustrate aspects of outer frame 102 and components thereof mentioned in FIG. 1E. In addition, FIGS. 1F and 1G show aspects of vertical member 132, which may have an angled portion 132' that extends from lower socket 130 to upper socket 130'. FIG. 1H shows an expanded view of the section indicated by the dotted oval in FIG. 1G.

FIG. 1F illustrates outer frame cross member 106 as an assembly of telescoping pieces 106a, 106b, and 106c. For example, side telescoping members 106a and 106c may be of the same diameter and may fit within center telescoping member 106b. effective to permit outer frame cross member 106 (as an assembly of telescoping pieces 106a, 106b, and 106c) to be lengthened or shortened along direction 107, e.g., to accommodate mounting within vehicles of different bed sizes. Assembly of telescoping pieces 106a, 106b, and 106c may be fixed at a particular length by fixing outer frame 102 to a particular vehicle such that side telescoping members 106a and 106c may be constrained at their attachment to outer frame parallel member 104, each of which in turn may be fixed to the vehicle. Alternatively, or in addition, side telescoping members 106a and 106c may be fixed in position by quick connect hardware (not shown, but corresponding to the quick connect hardware 131 and features 117 described herein for various connections). More generally, it is explicitly contemplated that any tubular member described herein may be configured as a telescoping assembly of two or more nesting members, which may be may be fixed in position by quick connect hardware described herein. For example, in various embodiments, tubular members herein that may be configured as a telescoping assembly include, e.g., 104, 106, 110, 112, 114, 116, 122, 130, 130', 132, 132', and the like.

In some embodiments, vertical member 132 may be raised or lowered with respect to its insertion in lower socket 130 and upper socket 130' to vary a height of outer frame cross member 106 (e.g., as assembly of telescoping pieces 106a, 106b, and 106c) along direction 129. In several embodiments, the height of outer frame cross member 106 (e.g., as assembly of telescoping pieces 106a, 106b, and 106c) along direction 129 may be varied by using vertical member 132 of varied lengths.

Lower socket 130 may be coupled to outer frame parallel member 104. Upper socket 130 may be coupled to sleeve 105". Sleeve 105" may, like sleeves 105/105', interact with cross member 106 to be rotated along rotational direction 113, to provide translation along direction 107 to allow the length of cross member 106 to be lengthened or shortened, and the like. Vertical member 132 may be configured with parallel lower and upper socket portions (not visible) coupled to respective ends of angled portion 132'. The parallel lower and upper socket portions of vertical member 132 may seat into, and may rotate within, lower socket 130 and upper socket 130'.

In various embodiments, by rotation of parallel lower and upper socket portions of vertical member 132 in lower socket 130 and upper socket 130', the angled portion 132' may provide motion of cross member 106 in two dimensions. For example, each angled portion 132' may be rotated 133' to move cross member 106 along direction 133, e.g., front to back with respect to a vehicle that vehicle rack 100 may be mounted in.

Further, the angled portion 132' may be rotated to translate, shorten, or lengthen cross member 106 along direction 107. For example, rotation of each angled portion 132' towards each other to the center would provide for shortening cross member 106 (e.g., as assembly of telescoping pieces 106a, 106b, and 106c) along direction 107. In another example, rotation of each angled portion 132' away from each other may provide for lengthening cross member 106 (e.g., as assembly of telescoping pieces 106a, 106b, and 106c) along direction 107. In another example, rotation of each angled portion 132' to one side or the other may provide for offset motion of cross member 106 (e.g., as assembly of telescoping pieces 106a, 106b, and 106c) along direction 107, or alternately lengthening and shortening cross member 106 (e.g., as assembly of telescoping pieces 106a, 106b, and 106c) along direction 107. In a further example, rotation of each angled portion 132' may be accommodated by translation of sleeves 105/105" along direction 107 of cross member 106. In some embodiments, rotation of each angled portion 132' may be accommodated by replacement of sleeves 105/105" or cross member 106 with corresponding longer or shorter versions of sleeves 105/105" or cross member 106, thereby adjusting the effective length or translation of cross member 106 along direction 107. Further, adjusting the length or translation of sleeves 105/105" or cross member 106 along direction 107 may provide for adjustment of each inner frame 108 along direction 107.

In various embodiments herein, quick connect hardware, such as 131, may be configured as a through pin with cotter pin, e.g., as in FIG. 1H, or alternatively configured as other quick connect hardware known to the art, such as a set screw, a spring loaded button, and the like. For example, quick connect hardware such as 131 may be secured through a feature 117, e.g., configured as a hole, in a larger diameter member such lower socket 130 to a smaller diameter member, such as the corresponding portion of vertical member 132 held within the larger diameter member such lower socket 130. In embodiments where quick connect hardware, such as 131 may be configured as a through pin, etc, the smaller diameter member, such as the corresponding portion of vertical member 132 may also have holes 117 to correspond to holes 117 in the larger diameter member such lower socket 130. In some embodiments, quick connect hardware, such as 131 may be configured as a set screw, spring loaded button, etc, and the smaller diameter member, such as the corresponding portion of vertical member 132 may also have features 117 configured as holes, or as detents. Further, for example, quick connect hardware, such as 131 may be configured as a set screw and the smaller diameter member, such as the corresponding portion of vertical member 132 may be devoid of features 117.

FIG. 1H shows in greater detail exemplary use of quick connect hardware 131 and corresponding features 117 that may be employed to position vertical member 132 in at various heights along direction 129, various rotational positions about 133', and various corresponding translations along 133 and 107 provided by rotation about 133'.

Accordingly, as shown in FIGS. 1E, 1F, and 1G, and further described herein above, in various embodiments of vehicle rack 100, outer frame cross member 106 (e.g., as assembly of telescoping pieces 106a, 106b, and 106c) may be adjustable in three dimensional space relative to the two longitudinal outer frame parallel members 104 to vary at least one of a length along direction 107, a height along direction 129, and a depth along direction 133 of the at least one outer frame cross member 106 relative to the two longitudinal outer frame parallel members 104.

Referring to FIG. 2, a perspective view of vehicle rack 100 mounted to vehicle 234 is illustrated. In one embodiment, vehicle rack 100 may be attached over a bed 238 of a pickup truck 234. In this embodiment, vehicle rack 100 allows a personal recreational vehicle to be stored on an angle over both bed 238 and cab 239 of pickup truck 234. Storing a personal recreational vehicle at an angle on longitudinal inner frame parallel members 110 of inner frame 108 may prevent overhang of personal recreational vehicle past tailgate 240 such that a trailer may be towed behind pickup truck 234 while conveying personal recreational vehicle on vehicle rack 100. Vehicle rack 100 may be permanently mounted to pickup truck 234, for example, by permanently affixing longitudinal outer frame parallel members 104 to side rails 236 of pickup truck 234. Other components of vehicle rack 100 may be removed relative to longitudinal outer frame parallel members 104. For example, vertical member 132 may be removed from socket 130 to remove one outer frame cross member 106 from being operatively connected to longitudinal outer frame parallel members 104. Longitudinal inner frame parallel members 110 of inner frame 108 may be operatively disconnected from outer frame cross member by removing one or more standoffs 114 from outer frame cross member 106. A bolted connection 109, as illustrated in FIG. 1A, of one outer frame cross member 106 may be removed to detach one outer frame cross member 106 from longitudinal outer frame parallel members 104. Tailgate 240 and bed 238 may still be used while vehicle rack 100 may be in place and in use on vehicle 234.

Referring to FIG. 3, a perspective view of vehicle rack 100 with two inner frames 108 is illustrated, while FIG. 3A illustrates portions of vehicle rack 100 in greater detail. Vehicle rack 100 may be adjusted and modular components may be added to vehicle rack 100 based on a user's desired configuration. Vehicle rack may be configured in any way to convey one or more personal recreational vehicles, so long as vehicle height, width, and gross weight conform to local driving rules. In one embodiment, vehicle rack 100 may be adjusted to conform to vehicle dimensions of a local jurisdiction. With reference to FIG. 3, distal end 116a of telescoping members 116 with dolly 120 may be extended away from inner frames 108 with a proximate end 116b of telescoping members 116 secured to telescoping member guides 118 by a quick-connect hardware 131. Telescoping member guides 118 may have one or more apertures therethrough which may align with one or more apertures through proximal end 116b of telescoping members 116 to secure telescoping members 116 to telescoping member guides 118. Quick-connect hardware 131 may be detached and proximal end 116b of telescoping members 116 may be retracted back toward tensioning device 124 to stow telescoping members 116 and dolly 120. One or more apertures 117 in distal end 116a of telescoping members 116 may be aligned with apertures 117 of telescoping member guides 118 and a quick-connect hardware 131 may be inserted therethrough to secure telescoping members 116 and dolly 120 in a stowed position relative to inner frames 108. In one embodiment, inner frames 108 may be equally spaced such that telescoping members 116 may be stowed on one telescoping member guide 118 from separate inner frames 108 such that telescoping members 116 and dolly 120 may be stored between each inner frame 108. In this embodiment, telescoping members 116 and dolly 120 may be stored between inner frames 108 to better distribute weight.

Height and angle of dolly 120 may be adjusted relative to distal end of telescoping members 116. In one embodiment, telescoping member guides 118 vary angles of telescoping members 116, and height and angle of dolly 120 may be adjusted to provide firm contact with a ground or lake bottom so as to load and unload a personal recreation vehicle. In this embodiment, vehicle 234 loads and unloads a personal recreation vehicle directly from shore in lieu of using a boat launch or similar method. In one embodiment, dolly cross member 321 provides adjustability of dolly 120 such that width of dolly can be varied to accommodate width variations of inner frame 108. Width adjustability of dolly 120 may be accomplished by aforementioned adjustability techniques such as telescoping members, apertures, and quick connect hardware.

Various portions of vehicle rack 100 may telescope within another to provide adjustability and other functionality. For example, portion 126 of inner frame 108 may have a first width/diameter which may allow portion 126 to telescope within portion 128 having a second width/diameter larger than first width/diameter of portion 126. Portion 128 having a larger second width/diameter may be of a different material and used to cover portion 126. In one embodiment, portion 128 may be of a soft material such as a polymeric material and cover all or portion of portion 126 which may be of a metal material. Portion 128 may be used to protect personal recreational vehicle from scratching. Portion 128 may be easily replaced by sliding portion 128 of a larger, second width/diameter over portion 126 with a smaller first width/diameter. In one embodiment, portion 126 may be cylindrical tubular aluminum. In another embodiment, portions 128 and 126 may be square tubing.

Referring to FIG. 4, a perspective view of vehicle 234 with vehicle rack 100 carrying one or more personal recreational vehicles 442 is illustrated. Personal recreational vehicle 442 may be stored on longitudinal inner frame parallel members 110 of inner frame 108 to be transported, or personal recreational vehicle 442 may be unloaded from longitudinal inner frame parallel members 110 onto telescoping members 116 and supported by adjustable dolly 120 for launch into an environment such as a lake. Personal recreational vehicle 442 may be secured to longitudinal inner frame parallel members by an attachment hardware (not shown) such as an attachment strap or be secured to longitudinal inner frame parallel members 110 by a weight of personal recreational vehicle 442 and gravity.

Referring now to FIG. 5, a side view of vehicle rack 100 and tensioning device 124 with its interconnection to personal recreational vehicle 442 is illustrated. Tensioning device 124, such as an electric winch, may tension or slacken one of a cable, rope, and chain 544 to load and unload personal recreational vehicle 442 to and from longitudinal inner frame parallel members 110 of inner frame 108. Cable, rope, chain 544 may have an attachment hardware 546 connected thereto for a quick connection to an attachment point 548 on personal recreational vehicle 442. In one embodiment, attachment hardware 546 may be a carabiner or like hardware for attaching to a tow-loop attachment point 548 on personal recreational vehicle 442.

Referring now to FIG. 6, a perspective view of vehicle rack 100 attached to vehicle 234 is provided. In one embodiment, vehicle rack 100 may be used to load, unload and transport a personal recreational vehicle 442 such as an ATV. In one embodiment, telescoping members 116 and longitudinal inner frame parallel members 110 interface with a geometry of personal recreational vehicle 442, such as a personal watercraft hull, to allow for direct loading and unloading to and from longitudinal inner frame parallel members 110 of inner frame 108. In another embodiment, personal recreational vehicles 442 may be attached to platform 650 to be conveyed over telescoping members 116 and onto longitudinal inner frame parallel members 110 of inner frame 108 for storage and transport thereon. Platform 650 may have one or more attachment points (not shown) or attachment hardware thereon (not shown) for fixedly securing personal recreational vehicle 442 to platform 650. Platform 650 may utilize platform wheels 652 for ease of loading and unloading platform 650 to and from telescoping members 116. Platform 650 may have an attachment point (not shown) for attaching a rope, chain, or cable for use with tensioning device 124.

FIG. 7 is a flow chart of a method 700 for using vehicle rack 100 to load a personal recreational vehicle 442. In one embodiment, method 700 may include removing one or more quick-connect hardware from a distal end of each of two or more telescoping member guides to free two retracted telescoping members connected to at least one inner frame (710). Method 700 may include extending two telescoping members from the at least one inner frame (720). Method 700 may include securing a proximate end of the extended telescoping member to at least one telescoping member guide with the one or more quick-connect hardware (730). Method 700 may include securing at least one of a rope, chain, and cable to a personal recreational vehicle (740). Method 700 may include applying a tension with a tensioning device to the at least one of a rope, chain, and cable, such that the tension draws the personal recreational vehicle onto the two extended telescoping members and further onto the at least one inner frame (750). Method 700 may include removing the one or more quick-connect hardware from each of the at least one telescoping member guide to free the proximate end of each of the two extended telescoping members (760). Method 700 may include retracting the proximate end of each of the two extended telescoping members back toward the at least one inner frame (770). Method 700 may include re-securing the one or more quick-connect hardware to both of a distal end of telescoping members and telescoping member guides to secure telescoping members relative to the inner frame (780).

In another embodiment, the vehicle rack 100 disclosed herein may be configured as a rack and davit system. FIG. 8 is a perspective view of a rack and davit system 800 mounted to the vehicle 234. In the illustrated embodiment, the rack and davit system 800 includes the vehicle rack 100 and a davit 802 removably coupled to the vehicle rack 100. The vehicle rack 100 may be configured to have functions set forth above and/or may be configured to function as a general vehicle rack for carrying items, such as a ladder, lumber, tools, etc.

FIG. 9 is a perspective view of the davit 802. In the illustrated embodiment, the davit 802 includes a first arm 804, a second arm 806, a first pulley 808, a second pulley 810, and a winch 812 having a winch line or winch wire 814. The winch line 814 may have a hook or a loop 816 at a terminal end 818. The winch line 814 may extend or may be routed from the winch 812 to the first pulley 808 and to the second pulley 810. The winch 812 may be configured to control and adjust the length of the winch line 814 (e.g., the length from the winch 812 to the terminal end 818). In some embodiments, the winch line 814 may be a winch line of a truck winch (e.g., a winch mounted to a truck's bumper for general purposes). For example, if the pickup truck 234 is configured with a general bumper-mounted winch, the winch line may be routed from the bumper winch to the davit 802.

With reference to FIG. 10, the first arm 804 may include an upstand pipe 820, a swivel rotation pipe 822, and a connecting pipe 824. The upstand pipe 820 may be configured to removably couple to a receiving socket of the vehicle rack 100. For example, the upstand pipe 820 may fit in the socket 130 on any of the longitudinal outer frame parallel members 104. The swivel rotation pipe 822 may be configured to rotatably and removably couple to the upstand pipe 820. For example, the swivel rotation pipe 822 may be a hollow pipe such that the upstand pipe 820 fits within the swivel rotation pipe 822 when the swivel rotation pipe 822 is coupled to the upstand pipe 822. The swivel rotation pipe 822 may rotate in rotational directions 826 (e.g., at any rotational angles from 0 degree to 360 degrees). The connecting pipe 824 may be configured to non-rotatably couple to the swivel rotation pipe 822. For example, the connecting pipe 824 may be a hollow pipe such that the swivel rotation pipe 822 fits within the connecting pipe 824 when the connecting pipe 824 is coupled to the swivel rotation pipe 822. A pin or a screw 828 may insert through the overlapping portions of the connecting pipe 824 and the swivel rotation pipe 822 to substantially limit the motion or rotation of the connecting pipe 824 relative to the swivel rotation pipe 822. The connecting pipe 824 and the swivel rotation pipe 822 may move and rotation together when the pin or screw 828 is secured. The swivel rotation pipe 822 may be rotated in the rotational directions 826 to adjust the orientation of the davit 802 relative to the vehicle rack 100.

With reference to FIG. 11, the second arm 806 may pivotally couple to the first arm 804 via a pivot assembly 830. The pivot assembly 830 may include any suitable mechanisms to enable pivotal coupling between the first arm 804 and the second arm 806. In the illustrated embodiment, the first pulley 808 may be coupled to the pivot assembly 830. The pivot assembly 830 may include one or more linkages 832 and one or more extendable linkages 834. The one or more linkages 832 may be configured to rotatably couple to the first arm 804 and rotatably couple to the second arm 806. The one or more extendable linkages 834 may be configured to rotatably couple to the second arm 806 and rotatably couple to the one or more linkages 832. The one or more extendable linkages 834 may be characterized by a length 836, which may be adjustable (e.g., longer or shorter). The one or more extendable linkages 834 may include sliding components 838 that may be slidable relative to one another and the sliding motion may be enabled via a screw mechanism 840 disposed on the one or more extendable linkages 834. For example, the screw mechanism 840 may be loosen to allow the sliding components 838 to slide relative to one another to elongate or shorten the length 836. The length 836 may be adjusted to a desired value, and the screw mechanism 840 may be tightened to secure the sliding components 838 relative to one another such that the length 836 maintains the desired value.

In some embodiments, an angle 842 between the first arm 804 and the second arm 806 may be adjusted by adjusting the length 836 of the one or more extendable linkage 834. For example, the screw mechanism 840 may be loosened to enable sliding of the sliding components 838 of the one or more extendable linkages 834. When the sliding components 838 are slided-in, the length 836 of the one or more extendable linkages 834 decreases, leading to a smaller angle 842. When the sliding components 838 are slided-out, the length 836 of the one or more extendable linkages 834 increases, leading to a larger angle 842. Subsequently, the screw mechanism 840 may be tightened to secure the sliding components 838 relative to one another such that the length 836 maintains the desired value and the angle 842 maintains the desired value.

In some embodiments, the length 836 of the one or more extendable linkages 834 remains unchanged, and the angle 842 between the first arm 804 and the second arm 806 may be adjusted by pivoting both the second arm 806 and the one or more linkages 832 relative to the first arm 804. For example, the angle 842 increases when the second arm 806 and the one or more linkages 832 pivot in a first pivot direction 831, and the angle 842 decreases when the second arm 806 and the one or more linkages 832 pivot in a second pivot direction 833. The one or more linkages 832 may include any suitable retention or resistant mechanisms, such as screw(s), spring(s), pins(s), to enable the angle 842 being adjusted and maintain the desired value.

As may be appreciated, the height of the davit 802 (e.g., the vertical distance from the second pulley 810 to the receiving socket 130 of the vehicle rack 100) and the angle 842 may be adjustable by adjusting the length 836 of the one or more extendable linkages 834. The height of the davit 802 and the angle 842 may also be adjustable by pivoting of both the second arm 806 and the one or more linkages 832 relative to the first arm 804. As used herein, pivoting of the second arm 806 and the one or more linkages 832 may be referred as a first height adjustment mechanism and the adjustment of the length 836 of the one or more extendable linkages 834 may be referred to as a second height adjustment mechanism. In some embodiments, the first height adjustment mechanism may be configured to adjust the height of the davit 802 to a greater extent than the second height adjustment mechanism. In some embodiments, the second height adjustment mechanism may be configured to adjust the height of the davit 802 to a greater extent than the first height adjustment mechanism.

With reference to FIG. 12, the second arm 806 includes the second pulley 810 at a terminal end 850 of the second arm 806. The second arm 806 may be extendable (e.g., the length of the second arm 806 may be adjustable). In the illustrated embodiment, the second arm 806 includes a first portion 852 and a second portion 854, configured to be slideable with respect to one another. In one embodiment, the second portion 854 may overlap and fit within a portion 855 of the first portion 852. In another embodiment, the second portion 854 may overlap and surround a portion 855 the first portion 852. The second portion 854 may be adjustably coupled to the first portion 852 via an adjustable detent mechanism 856 (e.g., selective adjustable pins) such that the second portion 854 may slide-out in a first direction 857 relative to the first portion 852 to elongate the length of the second arm 806 or slide-in in a second direction 859 relative to the first portion 852 to shorten the length of the second arm 806.

With reference to FIG. 13, the winch 812 and the tensioning device 124 shown in FIG. 5 may be the same device. In the illustrated embodiment, the winch 812 may be coupled to the swivel rotation pipe 822. The winch 812 and the swivel rotation pipe 822 may be removed from the vehicle rack 100 and subsequently coupled to the davit 802 by rotatably and removably coupling the swivel rotation pipe 822 to the upstand pipe 820 of the davit 802 as shown in FIG. 10. Subsequently, the winch line 814 may be pulled to route from the winch 812 to the first pulley 808 and to the second pulley 810. To install the winch 812 back to the vehicle rack 100, the winch line 814 may be rewound, the swivel rotation pipe 822 may be removed from the upstand pipe 820, and the swivel rotation pipe 822 and the winch 812 coupled thereto may be inserted back into the receiving socket (e.g., socket 130) of the vehicle rack 100.

The winch 812 may run from a power source that may be the same power source for the tensioning device 124. The power source for the winch 812 may be any or a combination of a variety of sources, including manual operation, dedicated power source such as an external or portable battery or small engine, hand tool such as a battery operated drill, the truck's battery, a power takeoff (PTO) from the truck's motor, and an external power source such as solar power, site generator, grid electricity, etc.

In some embodiments, the rack and davit system 800 may include a moving dolly that is configured to convey a personal vehicle when the personal vehicle is not loaded to the vehicle rack 100. The moving dolly may include a frame configured to support the personal vehicle and the moving dolly may include one or more swivel wheels, one or more non-swivel wheels, or both, coupled to the frame. The personal vehicle may be the personal recreational vehicle 422 and may be a personal watercraft. A moving dolly may carry and support the personal vehicle and may carry the personal vehicle to and from the rack and davit system 800. For example, the personal vehicle may be carried by the moving dolly to close proximity to the vehicle rack 100 such that the personal vehicle may be loaded to the vehicle rack 100. The moving dolly may be moved to close proximity to the vehicle rack 100 such that the personal vehicle may be unload from the vehicle rack 100 to the moving dolly.

FIG. 14 and FIG. 15 show a perspective view and a top view of an example of a moving dolly 900, respectively. In the illustrated embodiment, the moving dolly 900 may include a frame 902 and wheels 904 coupled to the frame 902. The wheels 904 may include one or more non-swivel wheels 906, one or more swivel wheels 908, or both. The frame 902 may include an upper frame 910 and a lower frame 912. The lower frame 912 may have a shape that conform to the bottom of the personal recreational vehicle 422. For example, the bottom of the personal recreational vehicle 422 may have a V-shape and the lower frame 912 may also have a V-shape. The upper frame 910 include longitudinal pipes 914 removably coupled to the lower frame 912. The longitudinal pipes 914 may extend along the longitudinal direction 916 of the lower frame 912 and/or of the personal recreational vehicle 422. The longitudinal pipes 914 may have extending portions or pipes 918 configured to be inserted into corresponding sockets 920 of the lower frame 912 (e.g., pipe in pipe). A locking mechanism 922, such as pins, may be inserted through the extending portions or pipes 918 and the corresponding sockets 920 to secure the upper frame 910 to the lower frame 912. A locking mechanism 922, such as pins, may be removed to decouple the upper frame 910 and the lower frame 912. In some embodiments, the upper frame 910 and the lower frame 912 may be one integral piece.

The frame 902 of the moving dolly 900 may be made of any suitable materials to support the personal vehicle (e.g., the personal recreational vehicle 422), and the upper frame 910 and the lower frame 912 may be made of the same or different materials. In some embodiments, the upper frame 910, the lower frame 912, or both, may be made of aluminum or aluminum based alloys. In some embodiments, the upper frame 910 may be coated with polyvinyl chloride (PVC).

A method for using the rack and davit system 800 (e.g., the davit 802 and the vehicle rack 100) may include mounting the davit to the outer frame (e.g., the longitudinal outer frame parallel members of the vehicle rack. The method may include inserting the upstand pipe into a receiving socket of the outer frame (e.g., the longitudinal outer frame parallel members) of the vehicle rack. The method may include removing the winch and the swivel rotation pipe coupled to the winch from the vehicle rack. The method may include coupling the winch to the upstand pipe by rotating the swivel rotation pipe onto the upstand pipe; coupling the first arm of the davit to the swivel rotation pipe; and routing the winch wire (e.g., winch line) from the winch to the first pulley and to the second pulley. The method may include rotating the davit around an axial direction of the first arm of the davit and adjusting a length of the second arm of the davit. Adjusting a height of the davit may include one or more of adjusting the first height adjustment mechanism of the pivot assembly and adjusting the second height adjustment mechanism of the pivot assembly. The method may include controlling the winch that may be a powered winch via a remote control. The method may include loading a personal vehicle from a moving dolly to the vehicle rack, wherein the moving dolly is configured to convey the personal vehicle when the personal vehicle is not loaded to the vehicle rack. The method may include unloading the personal vehicle from the vehicle rack to the moving dolly.

Unless specifically stated to the contrary, the numerical parameters set forth in the specification, including the attached claims, are approximations that may vary depending on the desired properties sought to be obtained according to the exemplary embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, and apparatuses have been illustrated by describing example embodiments, and while the example embodiments have been described and illustrated in considerable detail, it is not the intention of the applicants to restrict, or in any way limit, the scope of the appended claims to such detail. It is, of course, not possible to describe every conceivable combination of components or methodologies for purposes of describing the systems, methods, and apparatuses. With the benefit of this application, additional advantages and modifications will readily appear to those skilled in the art. Therefore, the invention, in its broader aspects, is not limited to the specific details and illustrative example and exemplary embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

The invention claimed is:

1. A rack and davit system, comprising:
   a vehicle rack for conveying a personal vehicle, comprising:
   an outer frame, the outer frame operable to mount to a bed side rail of a vehicle, the outer frame comprising two longitudinal outer frame parallel members, the two longitudinal outer frame parallel members joined by at least one outer frame cross member;
   at least one inner frame, the at least one inner frame operatively connected to the at least one outer frame cross member, the at least one inner frame comprising two longitudinal inner frame parallel members, the two longitudinal inner frame parallel members joined by at least one inner frame cross member;
   two telescoping members, each telescoping member operatively connected to a longitudinal inner frame parallel member, the two telescoping members operable to extend from and retract to the two longitudinal inner frame parallel members, such that when extended, the two telescoping members form a substantially parallel rail operable to convey an item for storage on the inner frame; and
   at least two telescoping member guides, the at least two telescoping member guides each operatively connected to each of the two longitudinal inner frame parallel members, the at least two telescoping member guides operable to guide and retain each of the two telescoping members, the at least two telescoping member guides further operable to adjust an angle of each of the two telescoping members;
   wherein the vehicle rack is mountable to the bed side rail of the vehicle such that the vehicle rack is clear of a tailgate and a bed of the vehicle effective to permit one or more of: use of the tailgate and the bed of the vehicle while the vehicle rack is mounted; and use of a trailer attached to the vehicle without interference from the personal recreational vehicle loaded on the vehicle rack, wherein each of the two telescoping members is selectively removable from the at least one inner frame, each of the two telescoping members further comprising a distal end portion and a proximal end portion, the distal end portion operable to telescope away from the at least one inner frame and the proximal end portion operable to remain operatively connected to the at least one inner frame,
wherein the distal end portion is connected to a dolly via a hinge or a selective mount, the dolly comprises a support comprising one or more wheels, one or more legs, or both, wherein the hinge or the selective mount is configured to adjust the dolly between a support-up orientation and a support-down orientation; and
a davit removably coupled to the vehicle rack, comprising:
a first arm removably coupled to the outer frame of the vehicle rack;
a second arm pivotally coupled to the first arm via a pivot assembly;
a first pulley coupled to the pivot assembly;
a second pulley coupled to a distal end of the second arm away from the pivot assembly; and
a winch having a winch line extending from the winch to the first pulley to the second pulley.

2. The rack and davit system of claim 1, wherein the winch comprises a powered winch and is configured to detach from the vehicle rack and couple to the first arm of the davit.

3. The rack and davit system of claim 2, wherein the winch is configured to couple to a swivel rotation pipe, the winch and the swivel rotation pipe are removed from the vehicle rack, and the swivel rotation pipe is configured to rotatably and removably couple to an upstand pipe, wherein the upstand pipe is configured to removably couple to a receiving socket of the vehicle rack.

4. The rack and davit system of claim 1, wherein the davit is rotatable around an axial direction of the first arm.

5. The rack and davit system of claim 1, wherein the pivot assembly comprises a first height adjustment mechanism and a second height adjustment mechanism, and the first height adjustment mechanism is configured to adjust a height and an angle of the davit to a greater extent than the second height adjust mechanism.

6. The rack and davit system of claim 1, wherein a length of the second arm is adjustable.

7. The rack and davit system of claim 1, wherein the vehicle rack is configured to permit one or more of:
the distal end portions are operatively connected by the dolly comprising a wheeled dolly, wherein a height and angle of the wheeled dolly is adjustable, and the two telescoping members, together with the wheeled dolly, are selectively mountable to the at least one inner frame to place the wheeled dolly in a wheels-down orientation or a wheels-up orientation; and
the at least one outer frame cross member adjustable in three dimensional space relative to the two longitudinal outer frame parallel members to vary at least one of a length, a height, and a depth of the at least one outer frame cross member relative to the two longitudinal outer frame parallel members.

8. The rack and davit system of claim 1, comprising a moving dolly that is configured to convey the personal vehicle when the personal vehicle is not loaded to the vehicle rack, the moving dolly comprises:
a frame configured to support the personal vehicle; and
one or more swivel wheels, one or more non-swivel wheels, or both, coupled to the frame.

9. A vehicle rack and davit system, comprising:
A vehicle rack, comprising:
an outer frame operable to mount to a bed side rail of a vehicle, the outer frame comprising two longitudinal outer frame parallel members, the two longitudinal outer frame parallel members joined by at least one outer frame cross member;
at least one inner frame, the at least one inner frame operatively connected to the at least one outer frame cross member by at least one adjustable inner frame standoff, the at least one inner frame comprising two longitudinal inner frame parallel members, the two longitudinal inner frame parallel members joined by at least one inner frame cross member;
two telescoping members, each telescoping member operatively connected to a longitudinal inner frame parallel member, the two telescoping members operable to extend from and retract to the two longitudinal inner frame parallel members, such that when extended, the two telescoping members form a substantially parallel rail operable to convey an item for storage on the inner frame,
wherein each of the two telescoping members further comprising a distal end portion and a proximal end portion, the distal end portions operable to telescope away from the at least one of the two longitudinal inner frame parallel members and the proximal end portion operable to remain operatively connected to the at least one of the two longitudinal inner frame parallel members, wherein the distal end portion is connected to a dolly via a hinge or a selective mount, the dolly comprises a support comprising one or more wheels, one or more legs, or both, and wherein the hinge or the selective mount is configured to adjust the dolly between a support-up orientation and a support-down orientation;
at least two telescoping member guides, the at least two telescoping member guides each operatively connected to each of the two longitudinal inner frame parallel members, the at least two telescoping member guides operable to guide and retain each of the two telescoping members, the at least two telescoping member guides further operable to adjust an angle of each of the two telescoping members,
wherein the vehicle rack is mountable to the bed side rail of the vehicle such that the vehicle rack is clear of a tailgate and a bed of the vehicle effective to permit one or more of:
use of the tailgate and the bed of the vehicle while the vehicle rack is mounted; and
use of a trailer attached to the vehicle without interference from a personal recreational vehicle loaded on the vehicle rack; and
wherein a portion of the vehicle rack other than the two longitudinal outer frame parallel members being selectively removable from the two longitudinal outer frame parallel members according to disconnection of one or more of:
at least one removable vertical member coupled to one or more sockets that together operatively couple the at least one outer frame cross member to the two longitudinal outer frame parallel members, the at least one removable vertical member being coupled to one or more sockets via quick-connect hardware;
one or more removable standoffs that operatively couple the at least one outer frame cross member to the longitudinal inner frame parallel members, the one or more removable standoffs being operatively coupled to the at least one outer frame cross member and/or the longitudinal inner frame parallel members via quick-connect hardware; and a bolted connection between one outer frame cross member and the longitudinal inner frame parallel members; and a davit removably coupled to the vehicle rack, comprising:

a first arm removably coupled to the outer frame of the vehicle rack;

a second arm pivotally coupled to the first arm via a pivot assembly, a first pulley coupled to the pivot assembly;

a second pulley coupled to a distal end of the second arm away from the pivot assembly; and a winch having a winch line extending from the winch to the first pulley to the second pulley.

10. The vehicle rack and davit system of claim 9, the winch comprises a powered winch and is configured to detach from the vehicle rack and couple to the first arm of the davit.

11. The vehicle rack and davit system of claim 10, wherein the winch is configured to couple to a swivel rotation pipe, the winch and the swivel rotation pipe are removed from the vehicle rack, and the swivel rotation pipe is configured to rotatably and removably couple to an upstand pipe, wherein the upstand pipe is configured to removably couple to a receiving socket of the vehicle rack.

12. The vehicle rack and davit system of claim 9, wherein the davit is rotatable around an axial direction of the first arm of the davit.

13. The vehicle rack and davit system of claim 9, wherein the pivot assembly comprises a first height adjustment mechanism and a second height adjustment mechanism, and the first height adjustment mechanism is configured to adjust a height and an angle of the davit to a greater extent than the second height adjust mechanism.

14. The vehicle rack and davit system of claim 9, wherein a length of the second arm is adjustable.

15. The vehicle rack and davit system of claim 9, wherein the vehicle rack is configured to permit one of:

the distal end portions are operatively connected by the dolly comprising a wheeled dolly, wherein a height and angle of the wheeled dolly is adjustable, and the two telescoping members, together with the wheeled dolly, are selectively mountable to the at least one inner frame to place the wheeled dolly in a wheels-down orientation or a wheels-up orientation; and the at least one outer frame cross member adjustable in three dimensional space relative to the two longitudinal outer frame parallel members to vary at least one of a length, a height, and a depth of the at least one outer frame cross member relative to the two longitudinal outer frame parallel members.

16. The vehicle rack and davit system of claim 9, comprising a moving dolly that is configured to convey a personal vehicle when the personal vehicle is not loaded to the vehicle rack, the moving dolly comprises:

a frame configured to support the personal vehicle; and one or more swivel wheels, one or more non-swivel wheels, or both, coupled to the frame.

17. A method for using a davit system coupled to a vehicle rack, comprising:

the vehicle rack comprising:

an outer frame, the outer frame operable to mount to a bed side rail of a vehicle, the outer frame comprising two longitudinal outer frame parallel members, the two longitudinal outer frame parallel members joined by at least one outer frame cross member;

at least one inner frame, the at least one inner frame operatively connected to the at least one outer frame cross member, the at least one inner frame comprising two longitudinal inner frame parallel members, the two longitudinal inner frame parallel members joined by at least one inner frame cross member;

two telescoping members, each telescoping member operatively connected to a longitudinal inner frame parallel member, the two telescoping members operable to extend from and retract to the two longitudinal inner frame parallel members, such that when extended, the two telescoping members form a substantially parallel rail operable to convey an item for storage on the inner frame; and at least two telescoping member guides, the at least two telescoping member guides each operatively connected to each of the two longitudinal inner frame parallel members, the at least two telescoping member guides operable to guide and retain each of the two telescoping members, the at least two telescoping member guides further operable to adjust an angle of each of the two telescoping members, wherein the vehicle rack is mountable to the bed side rail of the vehicle such that the vehicle rack is clear of a tailgate and a bed of the vehicle effective to permit one or more of:

use of the tailgate and the bed of the vehicle while the vehicle rack is mounted; and use of a trailer attached to the vehicle without interference from the personal recreational vehicle loaded on the vehicle rack;

wherein each of the two telescoping members is selectively removable from the at least one inner frame, each of the two telescoping members further comprising a distal end portion and a proximal end portion, the distal end portion operable to telescope away from the at least one inner frame and the proximal end portion operable to remain operatively connected to the at least one inner frame; and wherein the vehicle rack is configured to permit one or more of:

the distal end portions are operatively connected by a wheeled dolly, wherein a height and angle of the wheeled dolly is adjustable, and the two telescoping members, together with the wheeled dolly, are selectively mountable to the at least one inner frame to place the wheeled dolly in a wheels-down orientation or a wheels-up orientation; and the at least one outer frame cross member adjustable in three dimensional space relative to the two longitudinal outer frame parallel members to vary at least one of a length, a height, and a depth of the at least one outer frame cross member relative to the two longitudinal outer frame parallel members; and a portion of the at least one inner frame comprises a mount for a tensioning device, and the tensioning device comprises a winch; and mounting a davit to the outer frame of the vehicle rack.

18. The method of claim 17, mounting the davit to the outer frame comprises:
the davit comprising:
a first arm removably coupled to the outer frame of the vehicle rack;
a second arm pivotally coupled to the first arm via a pivot assembly;
a first pulley coupled to the pivot assembly;
a second pulley coupled to a distal end of the second arm away from the pivot assembly; and
a winch having a winch line extending from the winch to the first pulley to the second pulley;
inserting an upstand pipe into a receiving socket of the outer frame of the vehicle rack;
removing the winch and a swivel rotation pipe coupled to the winch from the vehicle rack;
coupling the winch to the upstand pipe by rotating the swivel rotation pipe onto the upstand pipe;
coupling the first arm of the davit to the swivel rotation pipe; and
routing a winch wire from the winch to the first pulley and to the second pulley.

19. The method of claim 17, comprising rotating the davit around an axial direction of the first arm of the davit.

20. The method of claim 17, comprising adjusting a length of the second arm of the davit.

21. The method of claim 17, comprising adjusting a height of the davit by one or more of:
adjusting a first height adjustment mechanism of the pivot assembly; and
adjusting a second height adjustment mechanism of the pivot assembly, wherein the first height adjustment mechanism is configured to adjust a height and an angle of the davit to a greater extent than the second adjust mechanism.

22. The method of claim 17, comprising controlling the winch that is a powered winch via a remote control.

23. The method of claim 17, comprising loading a personal vehicle from a moving dolly to the vehicle rack, wherein the moving dolly is configured to convey the personal vehicle when the personal vehicle is not loaded to the vehicle rack, the moving dolly comprises:
a frame configured to support the personal vehicle; and
one or more swivel wheels, one or more non-swivel wheels, or both, coupled to the frame.

* * * * *